United States Patent
Sun et al.

(10) Patent No.: US 6,480,615 B1
(45) Date of Patent: Nov. 12, 2002

(54) MOTION ESTIMATION WITHIN A SEQUENCE OF DATA FRAMES USING OPTICAL FLOW WITH ADAPTIVE GRADIENTS

(75) Inventors: Shijun Sun; Yongmin Kim, both of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/333,317

(22) Filed: Jun. 15, 1999

(51) Int. Cl.[7] ............................................. G06K 9/00
(52) U.S. Cl. ....................................... 382/103; 382/107
(58) Field of Search ................................ 382/107, 241, 382/157, 209, 181, 158, 159; 348/699; 706/20, 25

(56) References Cited

U.S. PATENT DOCUMENTS

| | | | | |
|---|---|---|---|---|
| 5,133,021 A | * | 7/1992 | Carpenter et al. | 382/107 |
| 5,142,590 A | * | 8/1992 | Carpenter et al. | 382/181 |
| 5,157,738 A | * | 10/1992 | Carpenter et al. | 382/157 |
| 5,654,771 A | * | 8/1997 | Tekalp et al. | 348/699 |

OTHER PUBLICATIONS

Lai et al.; "Using Color to Computer Optical Flow," Proceedings of SPIE, vol. 2056, 1993.
Fleet et al.; "Recursive Filters for Optical Flows," IEEE Transactions on Pattern Analysis and Machine Intelligence, vol. 17, 1995.
Bergen et al.; "Hierarchical Model–Based Motion Estimation," Proceedings of ECCV, Sprinher–Verlag 1992.
Beauchemin et al.; "The Computation of Optical Flow," ACM Computing Surveys, vol. 27, 1995.
Horn et al., "Determining Optical Flow," Artificial Intelligence, vol. 17, 1981.
Viterbi et al., "Principles of Digital Communication and Coding", McGraw–Hill Book Company, 1979.
Viterbi, Andrew J., "Error Bounds for Convolutional Codes and an Asymptotocally Optimum Decoding Algorithm," IEEE Transactions on Information Theory, vol. IT–13, No. 2, Apr. 1967.
Cohen, Laurent D., Note On Active Contour Models and Balloons; CVGIP: Image Understanding vol. 53, No. 2, Mar. 1991.
Kass et al., "Snakes: Active Contour Models;" International Journal of Computer Vision, pp. 321–331; 1988.
Singh et al.; "Comparison of Daubechies, Coiflet, and Symlet for Edge Detection;" SPIE vol. 3074; 0277–786X; 1997.

* cited by examiner

*Primary Examiner*—Andrew W. Johns
*Assistant Examiner*—Seyed Azarian
(74) *Attorney, Agent, or Firm*—Steven P. Koda

(57) ABSTRACT

The optical flow of an array of pixels in an image field is determined using adaptive spatial and temporal gradients. Artifacts are avoided for image objects which are moving smoothly relative to the image field background. Data from three image frames are used to determine optical flow. A parameter is defined and determined frame by frame which is used to determine whether to consider the data looking forward from frame k to k+1 or the data looking backward from frame k–1 to frame k in initializing spatial and or temporal gradients for frame k. The parameter identifies signifies the areas of occlusion, so that the gradients looking backward from frame k–1 to frame k can be used for the occluded pixel regions. The gradients looking forward are used in the other areas.

17 Claims, 12 Drawing Sheets

START
↓
OVERLAY TEMPLATE OVER STARTING WINDOW OF SEARCH AREA — 136
↓
DO CORRELATION BETWEEN TEMPLATE & SELECT WINDOW FOR EVERY ±Xth POSSIBLE WINDOW ALONG 1st AXIS (44) FROM STARTING WINDOW — 138
↓
REPEAT PRIOR STEP FOR EVERY ±Yth ROW OFFSET ALONG SECOND AXIS (46) FROM STARTING WINDOW — 140
↓
ANY CORRELATION WHICH RESULTS IN A CORR. COEFF. ≥ CUT VALUE * THRESHOLD VALUE IS A LOCAL MATCH — 142

MOTION ESTIMATION WITHIN A SEQUENCE OF DATA FRAMES USING OPTICAL FLOW WITH ADAPTIVE GRADIENTS

CROSS REFERENCE TO RELATED APPLICATIONS

This invention is related to U.S. patent application Ser. No. 09/216,692, filed Dec. 18, 1998 for "Template Matching Using Correlative Auto-Predictive Search;" U.S. patent application Ser. No. 09/216,691, filed Dec. 18, 1998 for "Template Matching in Three Dimensions Using Correlative Auto-Predictive Search"; U.S. patent application Ser. No. 09/233,894, filed Jan. 20, 1999 for "Color Clustering for Scene Change Detection and Object Tracking in Video Sequences;" and U.S. patent application Ser. No. 09/323501, filed Jun. 1, 1999, for "Video Object Segmentation Using Active Contour Modelling With Global Relaxation," of Shijun Sun et al. The content of all such applications are commonly assigned and are incorporated herein by reference and made a part hereof.

BACKGROUND OF THE INVENTION

This invention relates to motion estimation within a sequence of data frames, and more particularly to an improved optical flow method of deriving motion estimation.

Extracting motion information from a sequence of data frames is desirable for many applications in the fields of computer vision and data compression. In the context of computer vision, the data frames are frames of image data. Motion estimation is beneficial for many computer vision applications, including but not limited to (i) the estimation of three-dimensional scene properties, (ii) visual sensor motion estimation, (iii) motion segmentation, (iv) computing focus of expansion and time to collision of objects, (v) performing motion compensated image encoding, (vi) computing stereo disparity, (vii) measuring blood flow and heart wall motion in medical imagery, and (viii) even for the measuring of minute amounts of growth in seedlings.

Typically motion analysis involves a first stage in which the optical flow is measured in a sequence of two-dimensional image frames. A subsequent second stage involves deriving actual motion of image objects in three-dimensional space, or inference of some other higher level computer vision tasks from the computed optical flow. Optical flow is a measure of the apparent motion of a brightness pattern. More specifically optical flow is a distribution function of apparent velocities of movement of brightness patterns within a sequence of images. The image frame is a two dimensional array of pixels representing, perhaps, a three dimensional image. The image may include objects or components which move at differing velocities and in differing three-dimensional directions. The projection of three-dimensional surface-point velocities onto the two-dimensional viewable image plane of a display is approximated by the measures of optical flow for the differing portions of the image.

In "Determining Optical Flow," by B. K. P. Horn and B. G. Schunck, *Artificial Intelligence*, Vol. 17, pp. 185–204, 1981 a method for finding the optical flow pattern is presented which assumes that the apparent velocity of the brightness pattern varies smoothly almost everywhere in the image. Their computation is based on the observation that the flow velocity has two components and that the basic equation for the rate of change of image brightness provides only one constraint. Smoothness of the flow was introduced as a second constraint to solve for optical flow. Such smoothness constraint presumes there are no spatial discontinuities. As a result, Horn and Schunck excluded situations where objects occlude one another. This is because at object boundaries of an occlusion, discontinuities in reflectance are found.

The Horn and Schunck method is described in more detail below. Consider the image brightness at pixel (x,y) in the image plane at time t to be represented as the function I(x,y,t). Based on initial assumptions that the intensity structures of local time-varying image regions are approximately constant under motion for at least a short duration, the brightness of a particular point is constant, so that dI/dt =0. Based on the chain rule of differentiation, an optical flow constraint equation (I) can be represented as follows:

$$I_x(x,y,t) \cdot u + I_y(x,y,t) \cdot v + I_t(x,y,t) = 0 \quad \text{(I)}$$

where $I_x = \partial I(x,y,t)/\partial x$ = horizontal spatial gradient of the image intensity;

$I_y = \partial I(x,y,t)/\partial y$ = vertical spatial gradient of the image intensity;

$I_t = \partial I(x,y,t)/\partial t$ = temporal image gradient of the image intensity;

u=dx/dt=horizontal image velocity (or displacement); and v=dy/dt=vertical image velocity (or displacement).

The optical flow equation (I) is a linear equation having two unknowns, (i.e., u, v). The component of motion in the direction of the brightness gradient is known to be $I_t/(I_x^2 + I_y^2)^{1/2}$. However, one cannot determine the component of movement in the direction of the iso-brightness contours at right angles to the brightness gradient. As a consequence, the optical flow velocity (u,v) cannot be computed locally without introducing additional constraints. Horn and Schunck introduce the smoothness constraint. They argue that if every point of the brightness pattern can move independently, then there is little hope of recovering the velocities. However, if opaque objects of finite size are undergoing rigid motion or deformation, neighboring points on the objects should have similar velocities. Correspondingly, the velocity field of the brightness patterns in the image will vary smoothly almost everywhere. They admit however that such a smoothing constraint is likely to result in difficulties in deriving optical flow along occluding edges.

Given such smoothing constraint, the optical flow equation is solved by minimizing the sum of errors for the rate of change of image brightness. The total error to be minimized is:

$$\min_{(u,v)} \int_D (I_x \cdot u + I_y \cdot v + I_t)^2 + \alpha^2 \cdot (u_x^2 + u_y^2 + v_x^2 + v_y^2)^2 \, dx \, dy \quad \text{(II)}$$

where D represents the image plane, $u_x$, $u_y$, $v_x$, and $v_y$ are the velocity spatial gradients, and α is a parameter to control the strength of the smoothness constraint. The parameter α typically is selected heuristically, where a larger value increases the influence of the smoothness constraint.

The difficulty in handling incidents of occlusion is because image surfaces may appear or disappear in time, complicating and misleading tracking processes and causing numerical artifacts. Accordingly, there is a need for a method of estimating optical flow which is reliable even in the vicinity of occlusions.

SUMMARY OF THE INVENTION

According to the invention, the optical flow of an array of pixels in an image field is determined using adaptive temporal gradients and in some embodiments adaptive spatial gradients, so as to avoid artifacts at occlusions. In particular, artifacts are avoided for occlusions at image objects which are moving smoothly relative to the image field background, (e.g., generally constant velocity over the time periods from image frames k−1 to k+1).

According to one aspect of the invention, data from three image frames are used to determine optical flow. A parameter, S, is defined and determined frame by frame which is used to determine whether to consider the data looking forward from frame k to k+1 or looking backward from frame k−1 to frame k when initializing the spatial and/or temporal gradients for frame k. In particular, the parameter S signifies the areas of occlusion, so that the gradients looking backward from frame k−1 to frame k can be used for such pixel regions. The gradients looking forward are used in the other areas.

According to another aspect of the invention, the temporal gradients are determined by convolving a symmetric matrix to avoid one-half time interval shifts in data between the backward-looking and forward-looking temporal gradients.

According to another aspect of the invention, the parameter S is convolved in some embodiments with a smoothing function to define a more generalized parameter (e.g., $S_m$).

According to another aspect of the invention, an embodiment of the motion estimation method is implemented in a system for image object tracking and segmentation. In a described embodiment the system includes (i) a modified adaptive resonance theory-2(M-ART2) model for detecting changes of scenes, (ii) a two-dimensional correlative autopredictive search (2D CAPS) method for object tracking, (iii) an edge energy derivation method and (iv) an active contour model with global relaxation for defining optimal image object boundaries. The motion estimation method allows edge energy to be estimated based, not just on the color components, but also on the motion vectors ($V_x$, $V_y$). The motion estimation derived for a previous frame of image data provides guidance for the CAPS object tracking analysis in a current frame. For example, the motion estimation is used in one embodiment to reduce the search area when looking for a template match during CAPS processing. Also, the motion estimation during an initial frame simplifies user interaction. For example, when a manual process is used to identify an initial object to be tracked, rather than having a user identify edge points, the user can simply click on any one or more moving points on the object to be tracked.

According to one advantage of this invention, optical flow is determined without substantial artifacts, even in the presence of occlusions, where optical flow changes smoothly. According to another advantage of this invention, optical flow motion estimation within the image object tracking and segmentation system improves, for example, MPEG-4 video encoding and content based video editing. These and other aspects and advantages of the invention will be better understood by reference to the following detailed description taken in conjunction with the accompanying drawings.

DESCRIPTION OF SPECIFIC EMBODIMENTS

Optical Flow Derivation

The Gauss-Seidel iterative method represented below in equation (III) was used by Horn and Schunck to solve the optical flow equation based on data from two consecutive image frames:

$$u^{n+1} = \bar{u}^n - I_x \cdot \frac{I_x \cdot \bar{u}^n + I_y \cdot \bar{v}^n + I_t}{a^2 + I_x^2 + I_x^2} \qquad \text{(III)}$$

-continued $$v^{n+1} = \bar{v}^n - I_y \cdot \frac{I_x \cdot \bar{u}^n + I_y \cdot \bar{v}^n + I_t}{\alpha^2 + I_x^2 + I_x^2}$$

Figure 1:
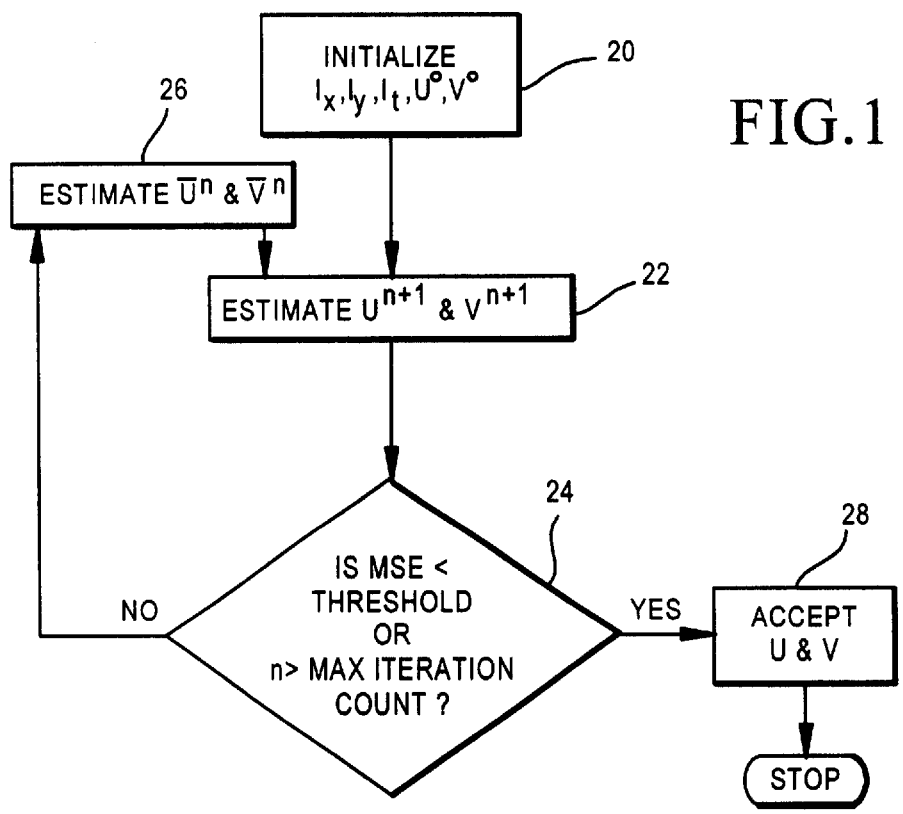
FIG. 1 is a flow chart of a conventional method for determining optical flow.

Here, n is an iteration counter and $\bar{u}$ and $\bar{v}$ are the weighted local averages of u and v, respectively. FIG. 1 shows a simplified flow diagram for the conventional Horn and Schunck method. At step 20, the spatial and temporal gradients are estimated from discrete image data. In addition, the initial estimates of $u^0$ and $v^0$ are set—typically, to zero. At step 22, the flow velocities, $u^{n+1}$ and $v^{n+1}$ are estimated. At step 24, the optical flow computed in a current iteration is tested to see if the maximum square error, MSE, (or in some embodiments the maximum absolute difference) is less than a threshold value, or if the iteration counter, n, exceeds a maximum iteration count. If neither branch test positive, then at step 26 $\bar{u}^n$ and $\bar{v}^n$, the weighted local averages of the flow velocities u and v are estimated. Then steps 22 and 24 are re-executed. If at step 24, either contingency tests positive, then the values for $u^{n+1}$ and $v^{n+1}$ are accepted at step 28 as the optical flow estimate for the image frame.

For two sequential image frames, k and k+1, the image gradients are estimated as $$I_x(i,j,k) \approx \frac{1}{4}[I(i,j+1,k) - I(i,j,k) + I(i+1,j+1,k) - \quad (IV)$$
$$I(i+1,j,k) + I(i,j+1,k+1) - I(i,j,k+1) +$$
$$I(i+1,j+1,k+1) - I(i+1,j,k+1)]$$

$$I_y(i,j,k) \approx \frac{1}{4}[I(i+1,j,k) - I(i,j,k) + I(i+1,j+1,k) -$$
$$I(i,j+1,k) + I(i+1,j,k+1) - I(i,j,k+1) +$$
$$I(i+1,j+1,k+1) - I(i,j+1,k+1)]$$

$$I_t(i,j,k) \approx \frac{1}{4}[I(i,j,k+1) - I(i,j,k) + I(i+1,j+1,k+1) -$$
$$I(i+1,j+1,k) + I(i,j+1,k+1) -$$
$$I(i,j+1,k) + I(i+1,j,k+1) - I(i+1,j,k)]$$

and the weighted local averages are estimated as $$\bar{u}(i,j,k) \approx \frac{1}{6} \cdot [u(i-1,j,k) + \quad (V)$$
$$u(i,j+1,k) + u(i+1,j,k) + u(i,j-1,k)] +$$
$$\frac{1}{12} \cdot [u(i-1,j-1,k) + u(i-1,j+1,k) +$$
$$u(i+1,j-1,k) + u(i+1,j+1,k)]$$

$$\bar{v}(i,j,k) \approx \frac{1}{6} \cdot [v(i-1,j,k) + v(i,j+1,k) +$$
$$v(i+1,j,k) + v(i,j-1,k)] +$$
$$\frac{1}{12} \cdot [v(i-1,j-1,k) + v(i-1,j+1,k) +$$
$$v(i+1,j-1,k) + v(i+1,j+1,k)]$$

Note that i and j correspond to spatial coordinates of a pixel and k corresponds to a temporal coordinate.

The Occlusion Problem

Figure 2A:
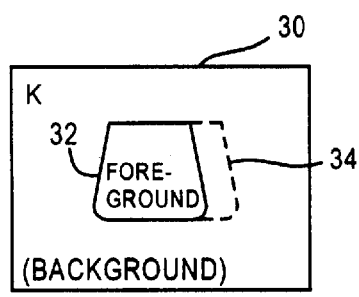
FIGS. 2A and 2B are two sequential data image fields illustrating the occlusion problem in optical flow analysis.
Figure 2B:
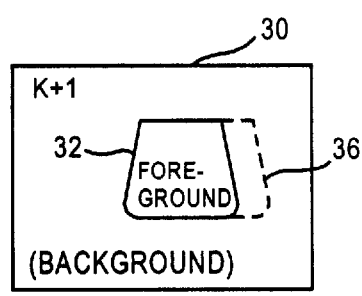

Referring to FIGS. 2A and 2B, two sequential frames k and k+1 of an image field 30 are depicted, in which a foreground image object 32 is moving from left to right relative to the image field 30 background. By sequential, it is meant that frames k and k+1 other number) does not come between frames k and k+1 in temporal order. Specifically, note that there may be image frames between frames k and k+1 that have not been sampled or that have been sampled and have been discarded for purposes of determining optical flow.

For purposes of discussion, frame k shows an area 34 just to the right of the foreground image object 32 which such object 32 shall occupy during the subsequent frame k+1. Specifically, due to the motion of object 32 area 34 will be covered in frame k+1. Similarly, frame k+1 shows an area 36 just to the right of the foreground image object 32 which such object shall occupy in frame k+2 (not shown).

Note that optical flow is evaluated based on at least 2 image frames. In comparing the data for frame k and frame k+1, however, there will be a discrepancy in area 34. Specifically, there will be calculated artifacts in deriving optical for area 34 because the brightness pattern in area 34 is not continuous. The same occlusion problem occurs in processing area 36 of frame k+1.

Figure 3A:
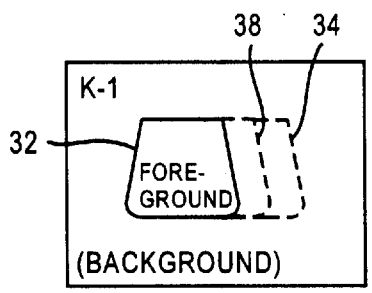
FIGS. 3A, 3B and 3C are three sequential data image fields illustrating the occlusion problem.
Figure 3B:
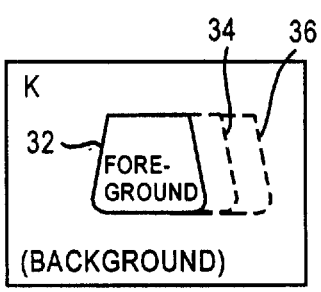
Figure 3C:
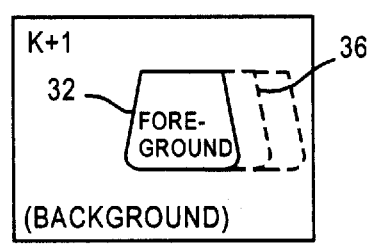

According to an embodiment aspect of this invention, the optical flow can be derived even for occlusions. FIGS. 3A, 3B and 3C show three sequentially sampled frames k–1,k and k+1 of the image field 30, in which the foreground object 32 is moving from left to right relative to the image field 30 background. Referring to FIG. 3A, in frame k–1 an area 38 is shown representing the portion of the background which the object 32 will move into during frame k. In addition frame k–1 shows the area 36 which the object will occupy in frame k+1. Focus in particular on the occlusion area 38. As object 32 moves during the time between sampling frame k–1 and frame k, the object 32 has moved relative to the background image field 30. In particular area 38 in frame k–1 is covered in frame k due to the object 32 motion. Assuming that the object 32 motion is smooth for a relatively short period of time, (e.g., the time period to sample frames k–1 through k+1), the occlusion in frame k (covering area 38 of frame k–1) can be recovered from the previous frame k–1. In particular by combining the image data from the three frames k–1, k and k+1 the occlusion challenge can be overcome.

Method for Determining Optical Flow

Using the data from frames k–1, k and k+1, adaptive spatial and temporal gradients are derived. In particular, forward spatial and temporal gradients are is derived for the optical flow from frame k to frame k+1, while backward spatial and temporal gradients are derived for the optical flow from frames k–1 to frame k. The respective gradients are defined below, where the superscript f corresponds to forward and the superscript b corresponds to backward:

$$I_x^f(i,j,k) \approx \frac{1}{4}[I(i,j+1,k) - I(i,j,k) + I(i+1,j+1,k) - \quad (VI)$$
$$I(i+1,j,k) + I(i,j+1,k+1) - I(i,j,k+1) +$$
$$I(i+1,j+1,k+1) - I(i+1,j,k+1)]$$

$$I_x^b(i,j,k) \approx \frac{1}{4}[I(i,j+1,k) - I(i,j,k) + I(i+1,j+1,k) -$$
$$I(i+1,j,k) + I(i,j+1,k-1) - I(i,j,k-1) +$$
$$I(i+1,j+1,k-1) - I(i+1,j,k-1)]$$

$$I_y^f(i,j,k) \approx \frac{1}{4}[I(i+1,j,k) - I(i,j,k) + I(i+1,j+1,k) -$$
$$I(i,j+1,k) + I(i+1,j,k+1) - I(i,j,k+1) +$$
$$I(i+1,j+1,k+1) - I(i,j+1,k+1)]$$

$$I_y^b(i,j,k) \approx \frac{1}{4}[I(i+1,j,k) - I(i,j,k) + I(i+1,j+1,k) -$$

-continued $$I(i, j+1, k) + I(i+1, j, k-1) - I(i, j, k-1) +$$
$$I(i+1, j+1, k-1) - I(i, j+1, k-1)]$$

$$I_t^f(i, j, k) \approx \frac{1}{4}[I(i, j, k+1) - I(i, j, k) +$$
$$I(i+1, j+1, k+1) - I(i+1, j+1, k) +$$
$$I(i, j+1, k+1) - I(i, j+1, k) +$$
$$I(i+1, j, k+1) - I(i+1, j, k)]$$

$$I_t^f(i, j, k) \approx \frac{1}{4}[I(i, j, k+1) - I(i, j, k) +$$
$$I(i+1, j+1, k+1) - I(i+1, j+1, k) +$$
$$I(i, j+1, k-1) - I(i, j+1, k-1) +$$
$$I(i+1, j, k-1) - I(i+1, j, k-1)]$$

A parameter, S, is defined below in equation (VII) to derive the gradients $I_x$, $I_y$, and $I_t$, adaptively from the forward and backward gradients defined in equation (VI):

$$S^f(i,j,k) = |I_x^f(i,j,k) \cdot u(i,j,k) + I_y^f(i,j,k) \cdot v(i,j,k) + I_t^f(i,j,k)| \quad \text{(VII)}$$

$$S^b(i,j,k) = |I_x^b(i,j,k) \cdot u(i,j,k) + I_y^b(i,j,k) \cdot v(i,j,k) + I_t^b(i,j,k)|$$

As per equation 1, S is to equal zero. In practice, though, the smaller the value of S, the better the solution to the optical flow equation. The spatial and temporal gradients are defined adaptively based on the values for S. Specifically, if $$S^f(i,j,k) \geq S^b(i,j,k), \quad \text{(VIII)}$$

Then $$I_x(i,j,k) = I_x^b(i,j,k)$$
$$I_y(i,j,k) = I_y^b(i,j,k) \quad \text{(IX)}$$
$$I_t(i,j,k) = I_t^b(i,j,k);$$

Otherwise, $$I_x(i,j,k) = I_x^f(i,j,k)$$
$$I_y(i,j,k) = I_y^f(i,j,k) \quad \text{(X)}$$
$$I_t(i,j,k) = I_t^f(i,j,k)$$

Figure 4:
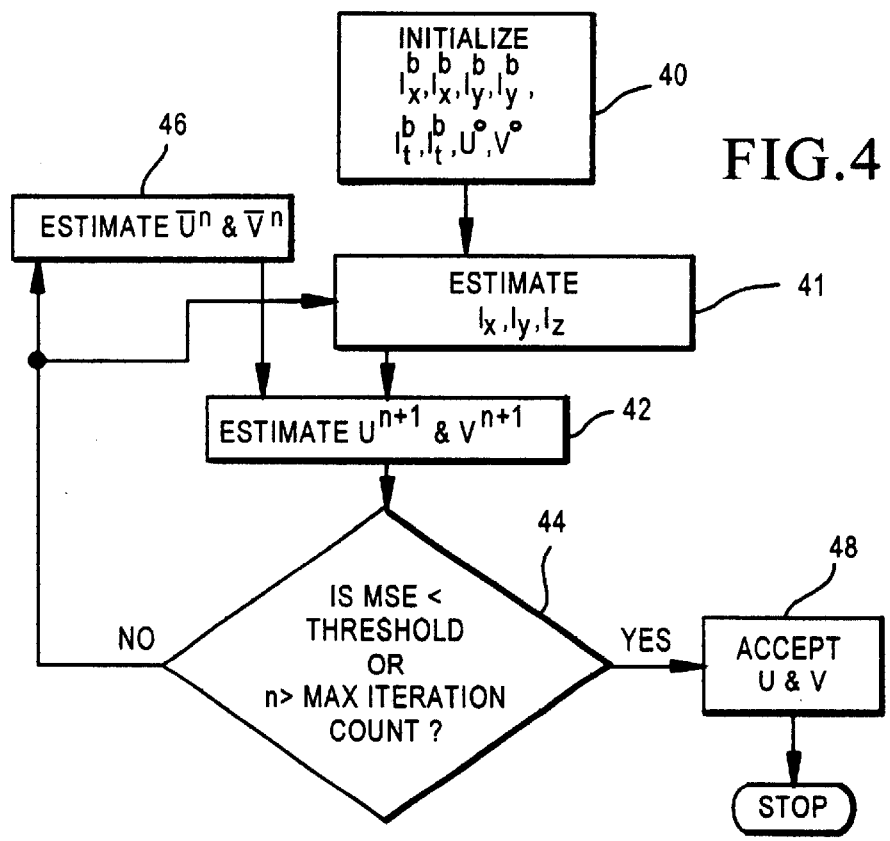
FIG. 4 is a flow chart of an optical flow determination method for an image frame k according to an embodiment of this invention.

Referring to FIG. 4, a flow chart of a method for determining optical flow according to one embodiment of this invention begins at step 40. The forward and backward spatial and temporal gradients (i.e., $I_x^f, I_x^b, I_y^f, I_y^b, I_t^f, I_t^b$) are derived for the horizontal, vertical and temporal dimensions based on equation (VI). In addition, the initial estimates of $u^0$ and $v^0$ are set—typically, to zero. At step 41, the adapted spatial and temporal gradients $I_x$, $I_y$, It are determined based on equations (VIII), (IX), and (X). At step 42, the flow velocities, $u^{n+1}$ and $v^{n+1}$ are estimated. At step 44, the optical flow computed in a current iteration is tested to see if the maximum square error, MSE, (or in some embodiments the maximum absolute difference) is less than a threshold value, or if the iteration counter, n, exceeds a maximum iteration count. If neither branch test positive, then at step 46 $\bar{u}^n$ and $\bar{v}^n$, the weighted local averages of the flow velocities u and v are estimated and at step 41, the adaptive gradients are redetermined. Then steps 42 and 44 are re-executed. If at step 44, either contingency tests positive, then the values for $u^{n+1}$ and $v^{n+1}$ are accepted at step 48 as the optical flow estimate for the image frame k.

Alternative Method for Determining Optical Flow

One difficulty with the method described with regard to FIG. 4 is that there is a one-half time interval shift in the spatial and temporal gradients, respectively. In an alternative embodiment the one-half time interval shift is avoided. In such alternative embodiment the spatial gradients $I_x$ and $I_y$ are derived from a single frame (k) using an edge detector such as the Sobel edge detection method. The spatial gradients based on the Sobel edge detection method are given below in equation (XI):

$$I_x(i, j, k) \approx \quad \text{(XI)}$$
$$\frac{1}{4}[I(i-1, j+1, k) - I(i+1, j+1, k) + I(i-1, j-1, k) -$$
$$I(i+1, j-1, k) + 2 \cdot I(i-1, j, k) - 2 \cdot I(i+1, j, k)]$$

$$I_y(i, j, k) \approx \frac{1}{4}[I(i-1, j-1, k) - I(i-1, j+1, k) +$$
$$I(i+1, j-1, k) - I(i+1, j+1, k) +$$
$$2 \cdot I(i, j-1, k) - 2 \cdot I(i, j+1, k)]$$

The forward and backward temporal gradients, $I_t^{f,b}$, are estimated by convolving a symmetric matrix with the frame differences (to have no spatial shift), as given below in equation (XII):

$$I_t^f(i, j, k) \approx \quad \text{(XII)}$$
$$\frac{1}{16}[4I(i, j, k+1) - 4I(i, j, k) + I(i+1, j+1, k+1) -$$
$$I(i+1, j+1, k) + 2I(i, j+1, k+1) - 2I(i, j+1, k) +$$
$$2I(i+1, j, k+1) - 2I(i+1, j, k) + 2I(i, j-1, kk+1) -$$
$$2I(i, j-1, k) + 2I(i-1, j, k+1) - 2I(i-1, j, k) +$$
$$I(i-1, j-1, k+1) - I(i-1, j-1, k) +$$
$$I(i-1, j+1, k+1) - I(i-1, j+1, k) +$$
$$I(i+1, j-1, k+1) - I(i+1, j-1, k)]$$

$$I_t^b(i, j, k) \approx \frac{1}{16}[4 \cdot I(i, j, k) - 4 \cdot I(i, j, k-1) +$$
$$I(i+1, j+1, k) - I(i+1, j+1, k-1) +$$
$$2 \cdot I(i, j+1, k) - 2 \cdot I(i, j+1, k-1) +$$
$$2 \cdot I(i+1, j, k) - 2 \cdot I(i+1, j, k-1) +$$
$$2 \cdot I(i, j-1, k) - 2 \cdot I(i, j-1, k-1) +$$
$$2 \cdot I(i-1, j, k) - 2 \cdot I(i-1, j, k-1) +$$
$$I(i-1, j-1, k) - I(i-1, j-1, k-1) +$$
$$I(i-1, j+1, k) - I(i-1, j+1, k-1) +$$
$$I(i+1, j-1, k) - I(i+1, j-1, k-1)]$$

The parameter S, is now redefined as in equation (XIII) below:

$$S^{f,b}(i,j,k) = |I_x(i,j,k) \cdot u(i,j,k) + I_y(i,j,k) \cdot v(i,j,k) + I_t^{f,b}(i,j,k)| \quad \text{(XIII)}$$

The temporal gradients are defined adaptively based on the values for S. Specifically, If $$S^f(i,j,k) \geq S^b(i,j,k) \quad \text{(XIV)}$$

Then $$I_t(i,j,k)=I_t^b(i,j,k) \quad (XV)$$

Otherwise $$I_t(i,j,k)=I_t^f(i,j,k) \quad (XVI)$$

Figure 5:
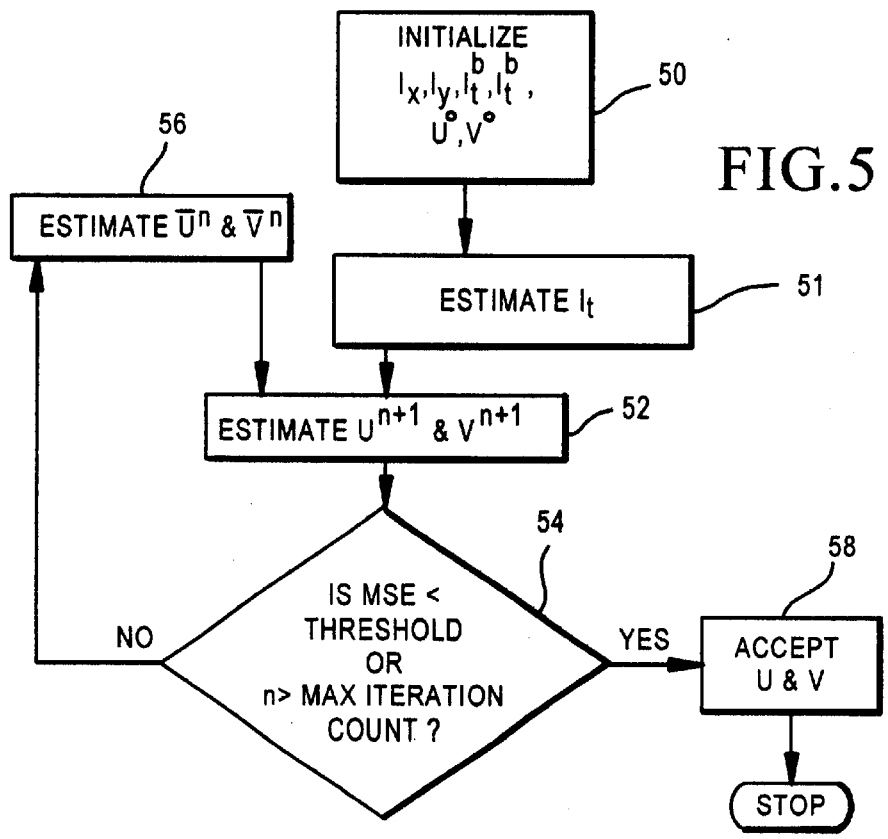
FIG. 5 is a flow chart of an optical flow determination method for an image frame k according to another embodiment of this invention.

Referring to FIG. 5, a flow chart of the alternative method for determining optical flow according to one embodiment of this invention begins at step 50. The spatial gradients (i.e., $I_x$, $I_y$) for the horizontal and vertical dimensions based on equation (XI)and The forward and backward temporal gradients (i.e., $I_t^f$, $I_t^b$) are derived for the temporal dimension based on equation (XII). In addition, the initial estimates of $u^0$ and $v^0$ are set—typically, to zero. At step 51, the adapted temporal gradient, $I_t$, is determined based on equations (XIV), (XV), and (XVI). At step 52, the flow velocities, $u^{n+1}$ and $u^{n+1}$ are estimated. At step 54, the optical flow computed in a current iteration is tested to see if the maximum square error, MSE, (or in some embodiments the maximum absolute difference) is less than a threshold value, or if the iteration counter, n, exceeds a maximum iteration count. If neither branch test positive, then at step 56 $\bar{u}^n$ and $\bar{v}^n$, the weighted local averages of the flow velocities u and v are estimated and at step 51, the adaptive temporal gradient is redetermined. Then steps 52 and 54 are re-executed. If at step 54, either contingency tests positive, then the values for $u^{n+1}$ and $v^{n+1}$ are accepted at step 58 as the optical flow estimate for the image frame k.

Both methods for determining optical flow are based on the assumption that optical flow is generally constant over the short term (e.g., from frames k−1 through k+1). In situations where the optical flow significantly varies within such time interval, artifacts still may occur. Consider, for example, a moving object which is changing direction with time. The embodiments described assume that optical flow is generally constant. According to these methods, the occlusion is avoided by looking backward rather than forward to recapture, in effect, the occlusion area for the current frame k. In doing so, however, when there has been a change in direction, some of the occlusion area differs. Thus, only part is recaptured leaving at least part of an artifact. Such shortcoming is not addressed here.

Object Tracking and Segmentation System

Figure 6:
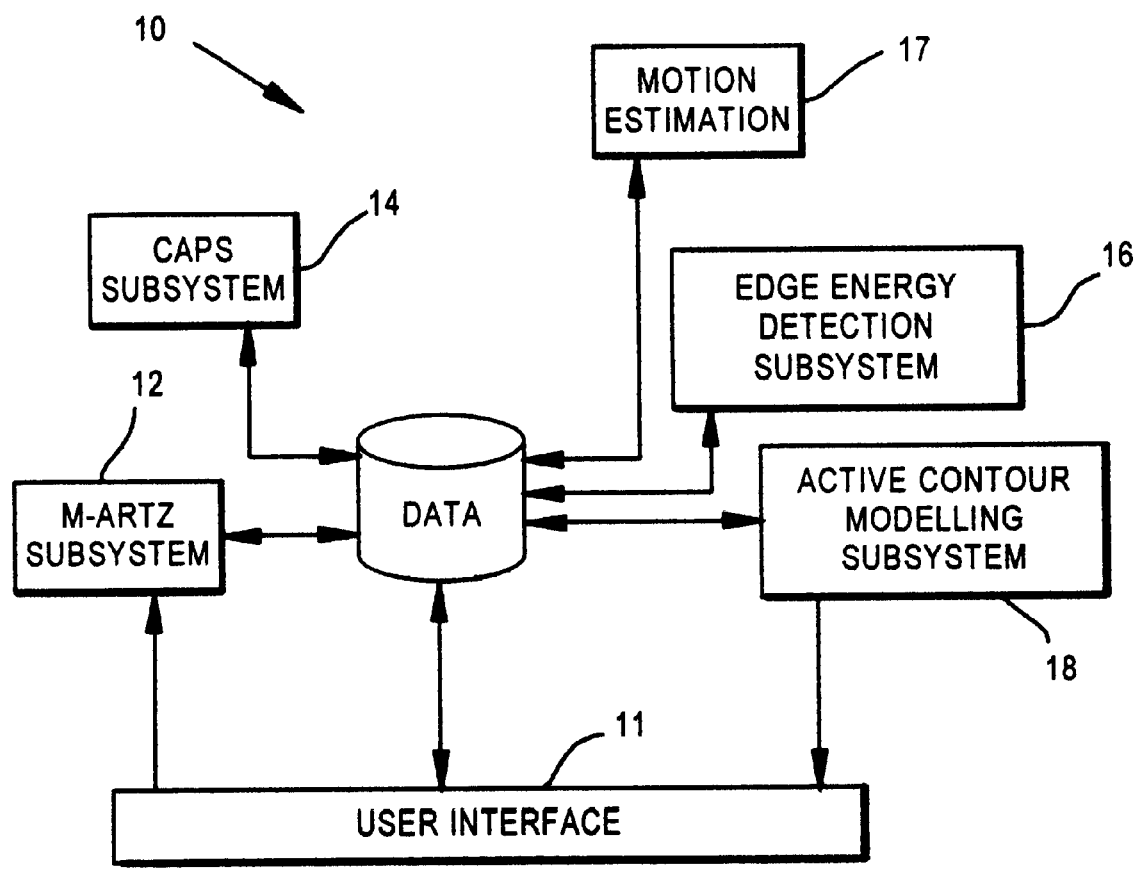
FIG. 6 is a block diagram of a system for performing video segmentation and object tracking according to an embodiment of this invention.

FIG. 6 shows a system 10 for image object segmentation and tracking according to one embodiment of the invention. System 10 includes a user interface 11, a modified adaptive resonance theory-2 (M-ART2) subsystem 12, a correlative auto-predictive search (CAPS) subsystem 14, an edge energy derivation subsystem 16, a motion estimation subsystem 17, and an active contour modelling subsystem 18. The M-ART2 subsystem 12 serves to detect scene changes in a sequence of image frames. The CAPS subsystem 14 serves to identify an object in a given image frame. The CAPS subsystem also serves to track the object among a sequence of input image frames. The motion estimation subsystem 17 generates motion vectors. The edge energy subsystem 16 serves to calculate the edge energy for an image object to be modelled. The active contour modelling subsystem 18 serves to segment an image object and accurately model an edge boundary of the image object being tracked.

The various subsystems are implemented in software on one or more host computing devices. Preferably the functions of the various subsystems are performed by programmed digital computers of the type which are well known in the art. A host computer system for embodiments of the invention typically includes a display monitor, a keyboard, a pointing/clicking device, one or more processors or multiprocessors, random access memory (RAM), a non-volatile storage device such as a hard disk drive, and other devices such as a communication or network interface (e.g., modem; ethernet adapter), a transportable storage media drive, such as a floppy disk drive, CD-ROM drive, zip drive, bernoulli drive or other magnetic, optical or other storage media. The various components interface and exchange data and commands through one or more busses. The computer system receives information by entry through the keyboard, pointing/clicking device, a network interface or another input device or input port. The computer system may be any of the types well known in the art, such as a mainframe computer, minicomputer, or microcomputer. To speed up computations, (e.g., convolutions, correlations) parallel processing may be implemented.

Figure 7:
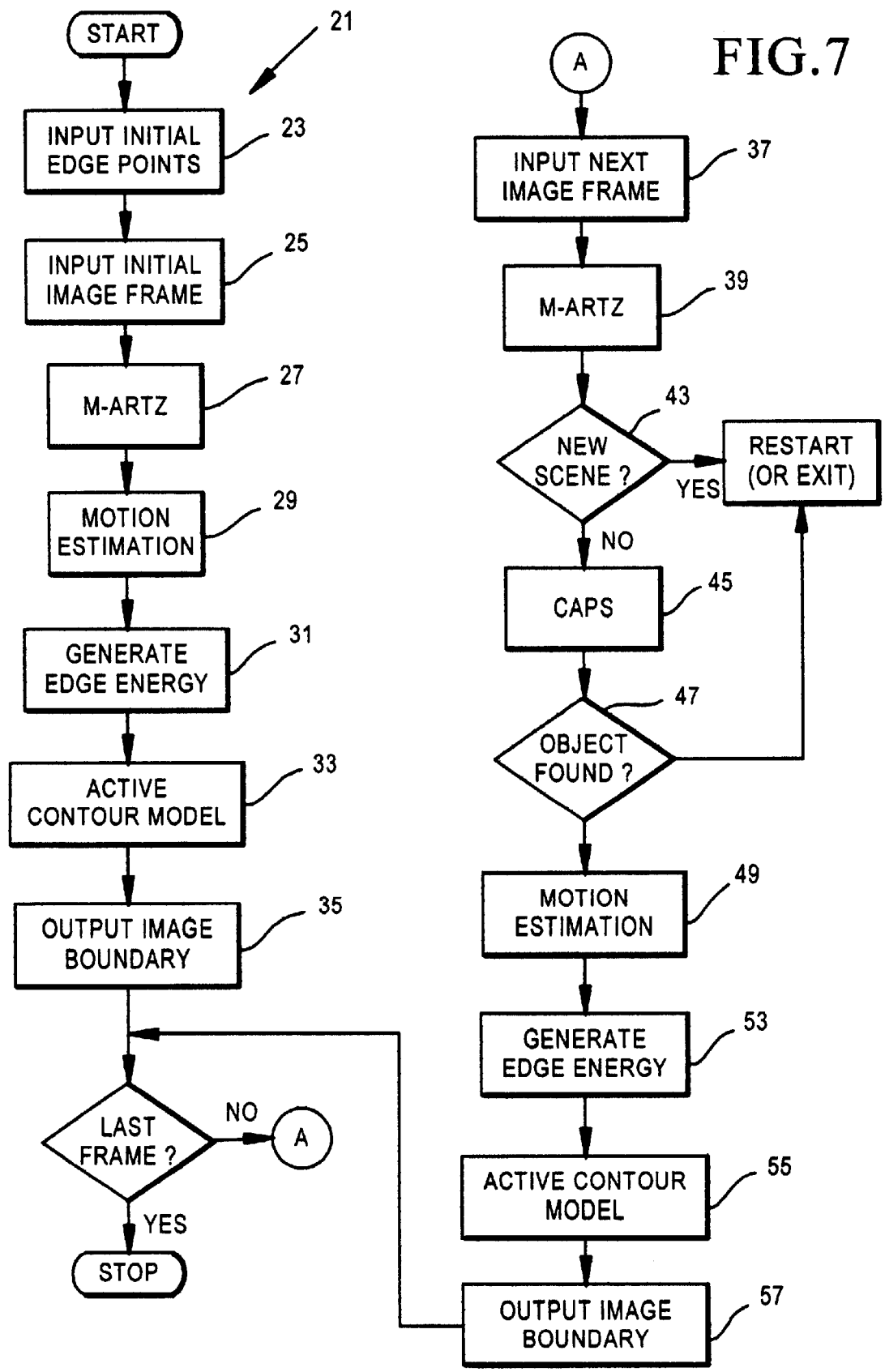
FIG. 7 is a flow chart of a method for processing a sequence of image frames to perform object tracking and image segmentation, including a method of motion estimation according to an embodiment of this invention.

FIG. 7 shows a system flow chart of a method 21 for tracking and segmenting an image object according to an embodiment of this invention. Input to the method at steps 23 and 25 are initial edge points and an initial image frame. In one application the initial edge in points are selected manually by an operator using a conventional video editing application interface. In another application the edge points are derived automatically and fed into a method embodiment of this invention.

The initial image frame is processed at step 27 using a modified applied resonance theory-2 (M-ART2) process to define clusters of image pixels. The M-ART2 process is described below in a separate section. At step 29, the motion estimation vectors are derived. At step 31 the edge energy of the input edge boundary is derived. Then at step 33 an active contour model is applied to segment the edge boundary and accurately model the object boundary. The active contour model is described below in a separate section. At step 35 the modelled image boundary is output. In some embodiments the output is written to a buffer, a file, and/or to a display.

Iterative processing then is performed for subsequent image frames. In some embodiments each image frame is processed. In other embodiments, image frames are periodically or a periodically sampled. At step 37 the next image frame to be processed is input to the method implementation 21. At step 39 the M-ART2 method is performed to identify whether there has been a scene change. If a scene change is detected at step 43, then the method 21 is complete, or is re-initialized to track another image object. If a scene change has not occurred, then the image object is identified from the image frame using a two-dimensional correlative auto-predictive search (2D-CAPS) process at step 45. The 2D-CAPS process is described below in a separate section. If at step 47 the image object is not found using the 2D-CAPS process, then the tracking method 21 terminates or re-initializes for tracking another object. If the object is identified, then the motion vectors are estimated at step 49 and the edge energy for the object boundary is derived at step 53. Then at step 55 an active contour model is applied to segment the image boundary and accurately model the object boundary. At step 57 the modelled image boundary is output. As described above for the initial image frame, in some embodiments the output is written to a buffer, a file, and/or to a video screen. The process then repeats steps 35, 37, 39, 43, 45, 47, 49, 53, 55, 57 for another image frame. As a result, an image object is segmented and tracked over many image frames.

Modified Applied Resonance Theory (M-ART2)—Scene Change Detection

A preferred embodiment of the method of modified applied resonance theory is described in the commonly-assigned U.S. patent application Ser. No. 09/233,894, filed Jan. 20, 1999 for "Color Clustering for Scene Change Detection and Object Tracking in Video Sequences." The content of such application is incorporated herein by reference and made a part hereof.

Figure 8:
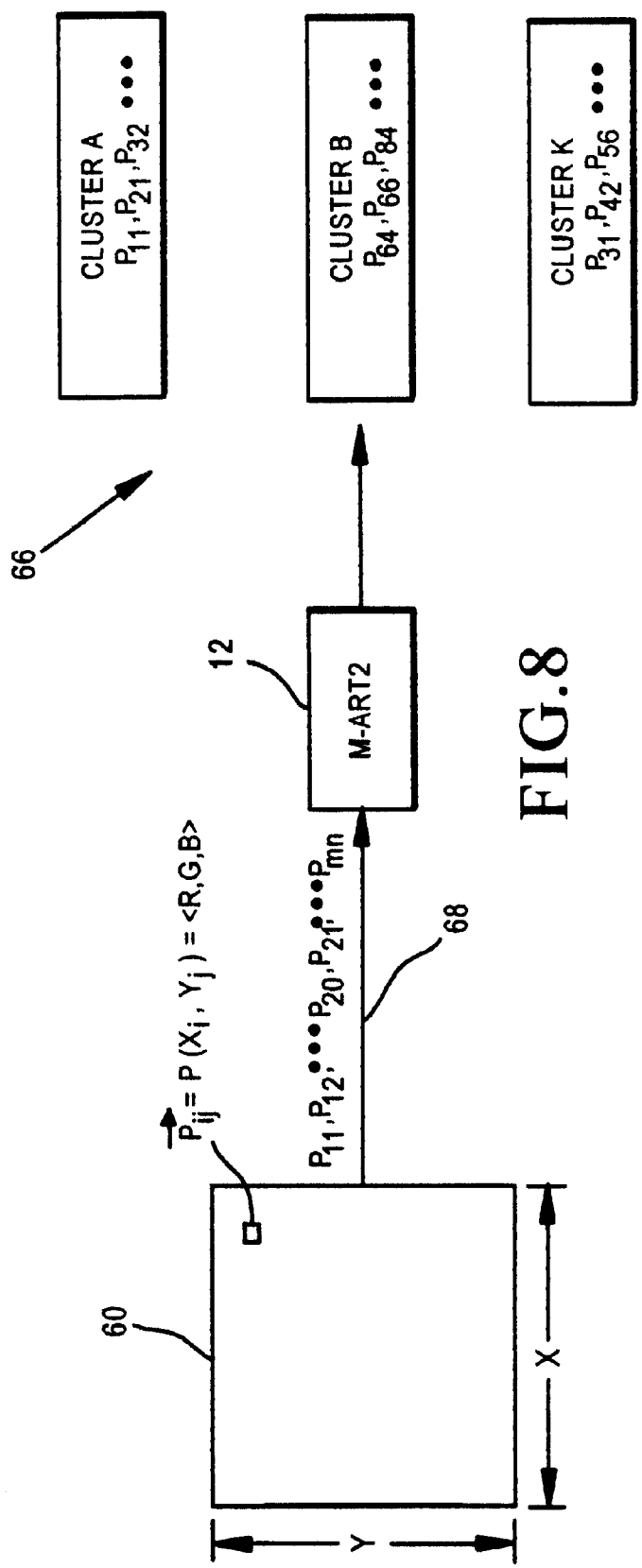
FIG. 8 is a diagram of an input, processing, output sequence for the modified applied resonance theory subsystem of FIG. 6.

The modified adaptive resonance theory-2 ("modified ART-2") subsystem 12 performs pattern learning and recognition on a sequence of input image frames. Referring to FIG. 8, the M-ART2 subsystem 12 processes a current image frame 60 grouping the image frame contents into clusters 66. The image frame 60 is formed by an array of image pixels P. For a raster type image frame, the image pixels are arranged into y rows and x columns. In a preferred embodiment the image pixels are color image pixels coded according to a standard red, green, blue coding scheme (e.g., NTSC), a standard yellow, magenta, cyan and black coding scheme (YMCK), a standard luminosity, chrominance, brightness coding scheme (e.g., YUV) or some other color coding scheme. Each image frame is a set of data points. Each pixel is a data point. A data point is referred to herein as an input vector. Input vector $P_{ij}$ corresponds to pixel P $(x_i,y_j)$ which for an RGB coding scheme has a value (R,G,B). The M-ART2 subsystem 12 processes a sequence 68 of input vectors P corresponding to a given set of data points (i.e., a current image frame 60). The input vectors P are grouped into clusters 66.

Each cluster 66 is a learned or a recognized pattern. For a first set of input data (i.e., an initial image frame) there is no prior information for allocating the data points into clusters. Thus, the patterns are learned. For subsequent sets of data points (e.g., subsequent images in a sequence of image frames), the patterns previously learned may be used. Specifically, data points for a current set of data points (image frame) are tested to try and recognize the prior patterns in the new set of data points. The process for analyzing the subsequent sets of data points is a recognition process. During the recognition process, the previous learned patterns also are updated and modified based upon the new data.

Figure 9:
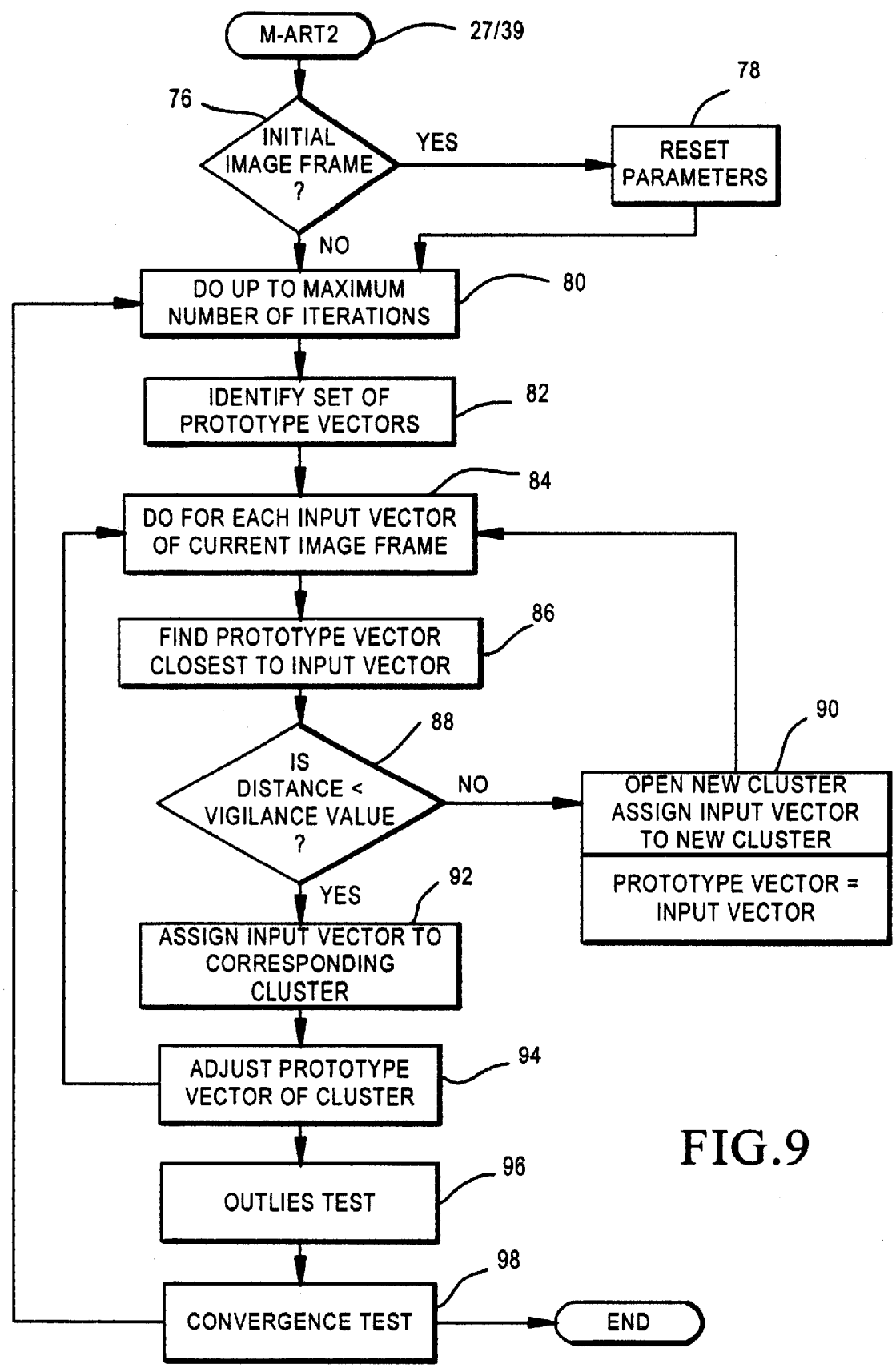
FIG. 9 is a flow chart for a method of pattern learning and recognition implemented by the modified applied resonance theory subsystem of FIG. 6.

Pattern Learning and Recognition:

Referring to FIG. 9, a flow chart of the M-ART2 process 27/39 for pattern learning and recognizing commences at step 76. If the current image frame is an initial image frame, then at step 78 various parameters are reset. Further, if the current image frame is an initial image frame then there are no clusters that have been started.

The current image frame 60 is processed in an iterative manner (step 80). At step 82, an initial set of prototype vectors for this processing iteration of the current image frame is obtained. There is a prototype vector for each cluster defined. If the current image frame is an initial image frame, then there are no prototype vectors. The prototype vector is a weighted centroid value based upon a history of input vectors allocated to the corresponding cluster.

The process for allocating input vectors into clusters is performed for each input vector (step 84). Such process is based upon a minimum distance measure. In various embodiments an euclidean distance, an absolute distance or some other distance measure is used. In one embodiment the euclidean distance is used. An input vector is allocated to a cluster to which it has a minimal euclidean distance with the cluster's prototype vector. At step 86, the prototype vector closest to the input vector is found.

As a self-organizing control for allocating data into clusters, a vigilance parameter, also referred to herein as a vigilance value, is used. A vigilance test is performed at step 88. If the minimum euclidean distance is not less than the vigilance value, then a new cluster is defined at step 90. The input vector is assigned to such new cluster and becomes the initial prototype vector for such new cluster. If the minimum euclidean distance is less than the vigilance value, then the input vector is assigned to the cluster corresponding to the closest prototype vector at step 92. Thus, an input vector is allocated to a pre-existing cluster or a new cluster.

For a new learning and recognition process, there are no prototype vectors to start with. Thus, the first input vector will define an initial prototype vector for a first cluster. The minimum distance between the next input vector and the prototype vectors will be to the first prototype vector (since at this point in the example there is only one prototype vector). If such minimum distance exceeds the vigilance value, then the second input vector becomes an initial prototype vector for a second cluster. If, however, such minimum distance is within the vigilance value distance, then the second input vector is allocated to the first cluster.

If the second input vector is allocated to the first cluster, then the prototype vector for such first cluster is modified at step 94. The modified prototype vector for the first cluster becomes the weighted centroid value for all data points among the first cluster, based upon the following equation:

$$w_k^{(new)} = \frac{P(x,y) + w_k^{(old)}\|cluster_k^{(old)}\|}{\|cluster_k^{(old)}\| + 1}$$

where, $w_k^{(new)}$=new prototype vector for cluster k=new centroid value;

$w_k^{(old)}$=old prototype vector for cluster k=old centroid value;

P(x,y)=input vector;

$\|cluster_k^{(old)}\|$=number of vectors in cluster k.

The influence of the new input vector in the cluster has a weighted influence on the prototype vector of the cluster. The weight is proportional to the number of input vectors in the cluster, and thus, corresponds to a statistical centroid. This process for updating the prototype vector provides a self-scaling feature to the cluster learning and recognition process.

This process is used for allocating each input vector of the current image frame. Once all the input vectors have been allocated in a given iteration, testing is performed to determine whether another iteration is needed and whether outlier clusters are present.

For an initial data set where no information is previously stored, one or more initial clusters are defined as above. An iterative process is used, however, to achieve a self-stabilizing quality to the clusters. Specifically, once the entire data set has been processed, allocating the input vectors into clusters, another iteration of allocating the input vectors into clusters is performed. Prior to performing another iteration, however, the clusters are analyzed for quantity in an outlier test (see step 96). According to such test, any cluster having less than a prescribed threshold number of input vector members is discarded. More specifically the prototype vector is discarded and thus not used in finding a minimum distance to input vectors during a subsequent iteration. The input vectors in the discarded cluster are considered to be outliers (e.g., noise).

Consider, for example, a data set including 30,000 data values. Also, consider that after the first iteration, a first cluster has 20,000 members, a second cluster has 8,000 members, a third cluster has 1985 members, and a fourth cluster has 15 members. In this example, assume the prescribed threshold value is 64. Because cluster 4 has less than 64 input vector members, it is discarded. It is expected that many of the input vectors in this fourth cluster will be allocated into another cluster during a subsequent reiteration. Note that this is an example, and that the threshold value may be prescribed as a matter of design, or based upon empirical analysis.

For the next iteration the prototype vectors from the remaining clusters of the prior iteration are retained (step 82 of next iteration). In our example above, the prototype vectors from the first three clusters are retained, while the prototype vector from the fourth cluster is discarded. Each input vector then is re-allocated to a cluster during this subsequent iteration by determining the prototype vector to which it has a minimum euclidean distance. If such minimum distance is less than the vigilance value, then the input vector is allocated to the cluster corresponding to that prototype vector. If such minimum distance exceeds the vigilance value, then the input vector defines a prototype vector for a new cluster. According to various embodiments, either the same or a different vigilance value is used during the subsequent iterations.

Upon identifying a cluster into which an input vector is allocated during a subsequent iteration, the prototype vector (i.e., weighted centroid) for such cluster is recalculated. During the subsequent iteration the number of input vectors in the cluster is not reset, but remains at its last count from the prior iteration. Thus, the weighting influence of the current input vector is less during the subsequent iteration than during the prior iteration.

After the subsequent iteration is complete, like in the prior iteration, any cluster having fewer than a prescribed threshold number of input vector members is discarded (step 96). The clusters then are tested for convergence (step 98) to see if the number of input vector members in each cluster has significantly changed. If the number has not changed significantly, then the iterative process is complete. In this sense, the process is self-stabilizing. If a cluster was discarded for such iteration, such discarded cluster is considered to be an outlier and the members are considered as noise.

The number of cluster members is considered to change significantly if it has changed by more than a prescribed number of data points or prescribed percentage, whichever is larger. Such number and percentage are defined empirically. If the number of members has changed significantly then a new iteration is performed (step 80). In the new iteration, the remaining (e.g., non-discarded) prototype vectors from the immediately prior iteration are used as the initial prototype vectors for each remaining cluster (step 82). The iterations continue until, either the number of members in each cluster is not changed significantly (convergence test at step 98), or a prescribed maximum number of iterations has occurred. Such maximum number of iterations is determined as a matter of design or empirically.

For a current image frame which is subsequent to an initial image frame, the prototype vectors correspond to the final prototype vectors from the preceding image frame processed among the sequence of image frames being processed. Each input vector in such current image frame is allocated to a cluster by determining the prototype vector to which it has a minimum euclidean distance (step 86). If such minimum distance is less than the vigilance value (step 88), then the input vector is allocated to the cluster corresponding to that prototype vector (step 92). If such minimum distance exceeds the vigilance value, then the input vector defines a prototype vector for a new cluster (step 90). A new cluster corresponds to a new prototype pattern. According to various embodiments, either the same or a different vigilance value is used for the subsequent image frames in the sequence relative to that used for an initial image frame. In a preferred embodiment, the vigilance value is increased for the subsequent data sets, relative to that for the initial data set.

Upon identifying a cluster into which an input vector is allocated, the prototype vector (i.e., centroid) for such cluster is recalculated. The number of input vectors in the cluster is held over from the processing of the prior image frame. Thus, the prototype vector is a weighted centroid based upon multiple iterations of multiple image frames in a sequence of image frames.

After all the input vectors of the current data set have been allocated into clusters, another iteration of allocating the input vectors into clusters is performed. Prior to performing another iteration, however, the clusters are analyzed for quantity in the outlier test (step 96). Any cluster having less than a prescribed threshold number of input vector members is discarded as described above for the initial data set. For the subsequent iteration the prototype vectors from the remaining clusters of the first iteration are retained. Each input vector then is re-allocated to a cluster during the subsequent iterations in the same manner as described above.

Each image frame in the sequence is similarly processed. In a preferred embodiment, the starting prototype vectors for allocating input vectors of a current data set are the final prototype vectors obtained during processing of the immediately prior data set. Further the count of the number of input vectors in a clusters is held over from prior iterations and prior image frames. New clusters defined as the sequence of data clusters continue correspond to new prototype patterns. New prototype patterns may occur in an image sequence, for example, due to an image object insertion, deletion or change.

Detecting Scene Changes Within a Sequence of Image Frames:

In the course of processing a sequence of image frames of a common scene, it is expected that much of the image content is similar from image frame to image frame. As a result, the defined clusters will be similar from image frame to image frame. The hold over of the count of input vectors in a cluster used in weighting the centroid of the cluster is based upon such assumption. If while processing a given image frame however, it is determined that the prototype vectors for each one of several clusters have changed beyond a threshold amount, then it is considered that the scene being imaged has changed. Specifically, upon processing any given image frame, if more than a prescribed number of prototype vectors has changed by more than a predetermined amount, then a scene change is considered to have occurred.

A scene change is determined by tracking a cluster change ratio from image frame to image frame. Specifically, after the iterative processing of input vectors for a current image frame is complete, the cluster rate of change for that image frame is derived. Cluster rate of change is derived in a preferred embodiment using the following equation:

$$R^f = \frac{\sum_{k=1}^{n_c^f} |N_k^f - N_k^{f-1}|}{N_{total}}$$

where, $R^f$ = cluster change ratio for image frame f;
$N_k^f$ = number of input vectors in cluster k of frame f (actual number, not the count used in prototype vector centroid which counts input vector for each iteration);
$N_{total}$ total number of input vectors in image frame f; and
$n_c^f$ = number of clusters in frame f.

Note that if the k-th cluster in frame f is a new cluster, then $N_k^{f-1}$ is simply zero. A scene change is identified at step 43 (see FIG. 7) when the cluster change ratio for an image frame f exceeds a prescribed value, (e.g., 5%–10%). The prescribed value is determined empirically or be design and may exceed the example values of 5%–10%.

If a scene change is detected for a current image frame f, then the method 21 terminates, or is restarted (at step 23) with the current image frame f set to be an initial frame. Image frame f then is re-processed as the current frame. Since it is an initial frame, parameters are reset at step 78. Specifically, the prototype vectors are discarded. Thus at step 82 there are no prototype vectors. As a result, during processing of the first input vector, such input vector will define a new cluster and become the prototype vector for such cluster (step 90). Additional cluster then are defined based upon whether the current input vector is farther than the vigilance value distance away from the prototype vector (s). Note that initially there are no prior input vectors in each new cluster (cluster count=0 when first deriving the weighted centroid of a new cluster).

Correlative Auto-Predictive Search (CAPS)—Object Tracking

A preferred embodiment of the correlative auto-predictive search process is described in the commonly-assigned U.S. patent application Ser. No. 09/216,692, filed Dec. 18, 1998 for "Template Matching Using Correlative Auto-Predictive Search." The content of such application is incorporated herein by reference and made a part hereof.

Figure 10:
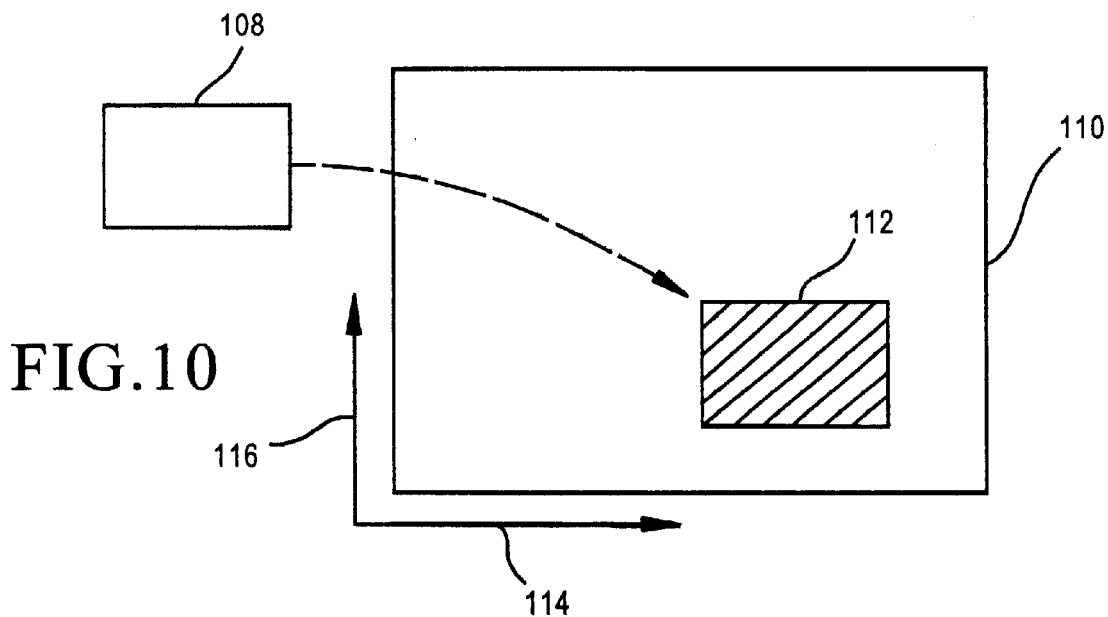
FIG. 10 is a diagram of a template and search area for performing a correlative autopredictive search (CAPS)

The CAPS process is executed for image frames following an initial image frame. The object to be tracked has been defined during processing of the initial image frame. The object location is updated (by the CAPS process) during processing of subsequent image frames. The initial object or the updated object from the prior frame serves as a template for locating the object in the current image frame. Referring to FIG. 10, the object being tracked serves as a template 108 while the current image frame serves as a search area 110. The template 108 is overlaid onto a window 112 within the search area 110. A motion vector is maintained which identifies the change in location of the object from one frame to the next. In some embodiments the motion vector derived from the previous frame is used to select a starting window 112. For example, the motion estimation subsystem 17 derives motion vector at step 29 for the initial frame and step 49 for subsequent frames. During CAPS processing the motion vector derived for a prior frame at one of these steps 29, 49 is used to estimate a window area where the object is located within the current frame. Such estimated location is the starting window within the search area for template matching to locate the object within the current image frame.

The template 108 data points are compared to the window's 112 data points to determine if the data points correlate to a desired degree. If they do, then a match for the template has been found. In a search area 110 formed by 'm' rows of 'n' data points, a template formed by 'k' rows of 'p' data points may be placed over (m–k+1)·(n–p+1) potential windows 112.

To reduce the number of windows 112 that the template 108 is compared with, an effective step size is derived from the template. According to a 2-dimensional implementation embodiment, a step size along a first axis 114 is derived and a step size along a second axis 116 is derived. Rather then compare the template to every possible window of the search area 110, the template 108 is moved along either or both of the first axis 114 and second axis 116 by the corresponding first axis step size or second axis step size.

Once the desired step sizes are derived, then the template 108 is compared to the various windows 112 of the search area 110 at the step size increments during a fast search process. In one embodiment the comparison is a correlation function of the template 108 and the window 112 and results in a correlation coefficient. Any window 112 in which the correlation coefficient with the template 108 is found to exceed a specific value is a local match for the template. In a preferred embodiment the specific value is the cut value times a threshold value.

Next, a full search then is performed in the vicinity of any location which is a local match. A full search of such vicinity encompasses performing a correlation between the template and every potential search area window between the local match location window and the windows at the prior and next step in each of the horizontal and vertical axes. For example, if the horizontal step size is 3 pixels and the vertical step size is 4 pixels, then correlations are performed for windows±1 pixel and±2 pixels along the horizontal axis and±1 pixel, ±2 pixels and ±3 pixels along the vertical axis. In addition correlations are performed for windows off the axes within the area delineated by the step sizes. Thus, the full search of the vicinity of the local match for this example includes (2*2+1)*(2*3+1)–1=34 correlations between the template and the search area. Any locations among the local match locations and the locations tested during the full search of the vicinity which exceed the threshold value are considered template matches. In some embodiments, only the location having the highest correlation is considered a match. In other embodiments there may be multiple matches. Thus, the top matches or all matches above the threshold are selected as resultant matches.

Figure 11:
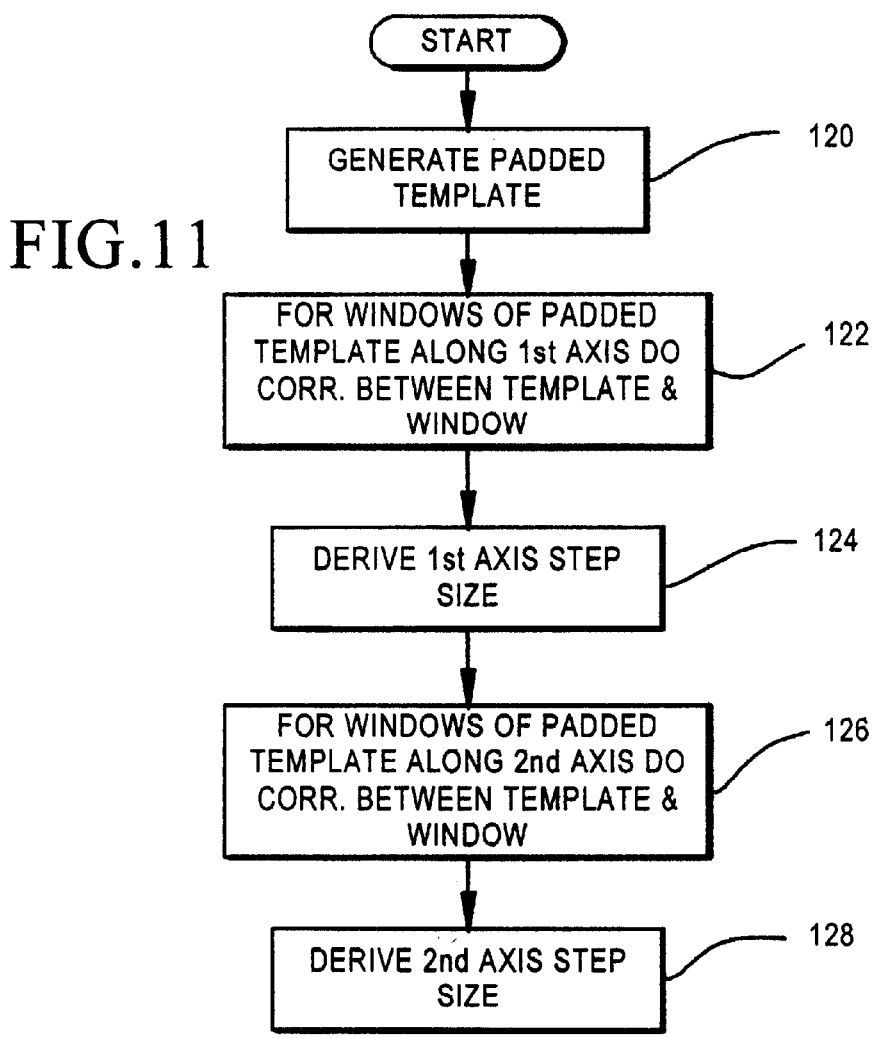
FIG. 11 is a flow chart of a process for determining CAPS step sizes according to an implementation of the CAPS subsystem of FIG. 6.

Determining Step Size:

To determine effective step sizes, the template 108 itself is analyzed. Referring to FIG. 11, at a first step 120 the template 108 is padded with additional data points to achieve a padded template. For circular padding, multiple copies of the template 108 are used to increase the template size. The number of copies may vary for differing embodiments. In a preferred embodiment there are at least 9 full copies. of the template in the circularly padded template. In another embodiment, a padded template is achieved by linear padding. For linear padding, data points are added in which each data point has a common value. The common value is a padding constant. In one embodiment the padding constant may be 0 or another fixed value. In a preferred embodiment the padding constant is derived from the data values of the various data points which make up the template 108. For example, in one embodiment an average data value is derived for all the temple 108 data points using any of various averaging techniques. This average value serves as the padding constant. For image data, the added data points are pixels and the padding constant is a pixel intensity and/or color. Preferably the center window of the padded template formed by linear padding also is formed by the original template 108.

Referring again to FIG. 11, at another step 122 the template 108 is correlated to various windows of the padded template. Because the center of the padded template equals the original template 108, it is known that the correlation between the template 108 and the center window is 1.0. Thus, that correlation need not be calculated. It is already known. For a two dimensional analysis, a correlation between the original template 108 and windows of the padded template are derived for windows along either of such axes 114, 116 moving in either direction away from the center window. The step size for selecting adjacent window to evaluate is one data point. Consider for example a template which is 40 pixels by 60 pixels and a padded template which is 120 pixels by 180 pixels. The step size is one pixel. Starting from the center window, there are 40 potential windows in a first direction along the first axis 114 and 40 potential windows in a second, opposite direction along the same axis 114. In step 122 a correlation is performed between the template and the select windows. As the selected window changes along the first axis 114 in the first direction, the resulting correlation coefficient is likely to decrease below 1.0. Eventually there will be a window where the correlation coefficient falls to a prescribed cut-off value. Such cut-off value may vary for differing embodiment, but preferably is less than a threshold value which identifies an estimated match between a window and the template. A window will be found in the padded template in each direction along axis 114 where the cut-off criteria is met.

Rather than perform a correlation for each potential window along the first axis 114, correlations are performed for windows along the axis 114 away from the center window in each direction until a window is identified in such direction where the correlation coefficient intersects the cut-off value. For two dimensional analysis, there is a cut-off point found in each direction from the center window along the first axis 114. The distance between those two windows in data points is the width along the first axis.

Referring to FIG. 11, at step 124 the first axis step size is derived from the width along the first axis 114 between windows which have a correlation to the template 108 equal to or less than the prescribed cut-off value. The step size along the first axis 114 is a fraction of the width. In a preferred embodiment, one-half the width is taken as the step size for the given axis. In other embodiments, the step size is taken as the entire width or some other fraction of the width.

In steps 126 and 128 the correlations are repeated along the second axis 116 in two opposing directions to find a width along the second axis 116. For two dimensional analysis, there is a cut-off point found in each direction from the center window along the second axis 116. The distance between those two windows in data points is the width along the second axis. A fraction of this distance is taken as the step size for the corresponding axis (e.g., first axis, or horizontal, step size; second axis, or vertical, step size). In a preferred embodiment, one-half the width is taken as the step size. In other embodiments, the step size is taken as the entire width or some other fraction of the width. Preferably, the step size along the second axis 116 is derived in the same manner as the step size along the first axis 114. The step sizes are referred to herein as correlative auto-predictive search ('CAPS') step sizes.

Figures 12, 13:
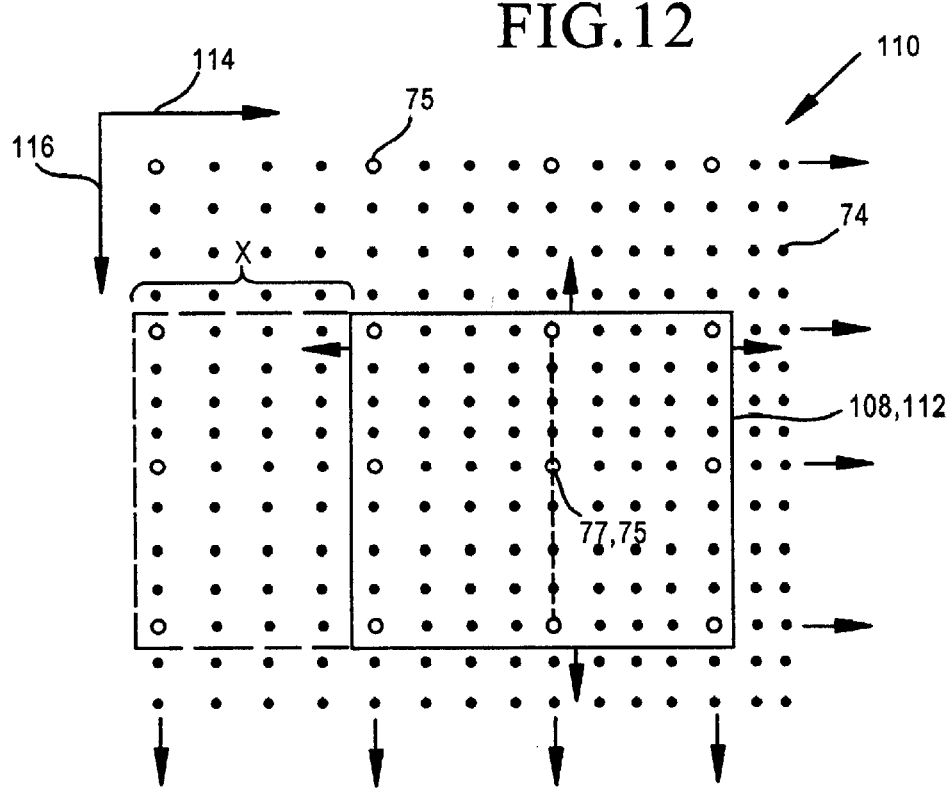
FIG. 12 is a diagram of a search area of data points with a window area to be tested against a template.
FIG. 13 is a flow chart of a process for performing a fast search of the search area to identify local matches between a template and a subset of window areas of the search area.

Fast Search:

Once the CAPS step sizes have been derived, a fast search is performed comparing the template 108 to the search area 110. It is a fast search in the sense that not every potential window of the search area is compared to the template. Referring to FIG. 12, the search area 110 is shown as an array of data points 74, 75 such as image pixels points. The two CAPS step sizes are used for selecting windows from the search area 110 to be compared to the template. The data points in the search area 110 about which the template is centered during successive steps are designated with an open circle and part number 75. Other data pints in the points which are not center points are designated as a data point 74.

Referring to FIG. 13, at a step 136 the template 108 (see FIG. 10) is overlaid to a starting window 112 of the search area 110. The starting window can be any window of the search area. In a preferred embodiment the starting window 112 is selected by predicting the object location with the motion vector, derived for the previous frame. In one embodiment a linear prediction calculation is implemented, although other more complex prediction algorithms also may be used.

At step 138 a correlation is performed between the template 108 and the starting window and every+/−x-th window along the first axis 114, where x is the first axis step size. Thus, for a horizontal axis step size of 'x', the template is shifted along the horizontal axis 114 by x data points at a time. More specifically, a center point 77 of the template 108 coincides with a given pixel 75 for a given iteration. The template then is moved to center over another data point 74 that is x points away from the given pixel 75 along the horizontal axis 114. The template 108 is moved in each direction along the axis 114 using the first step size of x. A correlation is performed at each step.

At step 140 the shifting along the first axis 114 and testing of windows is performed for a template center point repositioned over every y-th row of data points. Specifically, once the initial row of the search area has been tested, the template 108 is moved along the second axis 116 to another row that is y data points away, where y is the second axis step size. This next row then is tested by shifting along the first axis 114 using the first axis step size. A correlation is performed at each iteration. Then another row is tested which is y data points away along the second axis 116. In this manner the template is shifted by the second step size along the second axis 116 and by the first step size along the first axis 114 to select windows to be tested during the fast search. For example, in a search area which is 400 pixels by 400 pixels, and where the first axis step size is four and the second axis step size is four, there are 100*100=10,000 windows tested during the fast search.

Of the tested windows, at step 142 the window location for any correlation which resulted in a correlation coefficient which is greater than or equal to the product of the cut value times a predetermined threshold value is considered a local match. In a preferred embodiment the cut value is the same for each axis. Where the cut value used along one axis differs from the cut value used along the other axis, either cut value may be used. Alternatively, an average of the cut values may be used. The threshold value is a predetermined value and signifies the minimum correlation coefficient acceptable to designate a window as being a match for the template. Typical values are 0.8 and 0.9. The specific value may vary based upon the search area or type of date. The specific value may be determined empirically for different types of data or search area characteristics.

Local Full Search:

Once the fast search is complete (or during the course of the fast search), a local full search is performed about each of the local matches. For a given window of the search area 110 which is a local match, the windows which are within a 2-dimensional area bounded by the step sizes (for the respective axes) are tested by a local full search. Note that the windows which are exactly a step size away along either axis 114, 116 were already tested during the fast search. To do the local full search we test all the intermediary windows in the area between the local match and the windows plus or minus one step size away along either axis 114, 116. For example, given a first axis step size of x and a second axis step size of y, the windows having a center point which are +/−0, 1, 2, . . . , x−1 data points away from the locally matched window along the first axis, and +/−0, 1, 2, . . . , y−1 data points away from the locally matched window along the second axis, are tested during the full search. Although, the local match need not be recorrelated.

Figure 14:
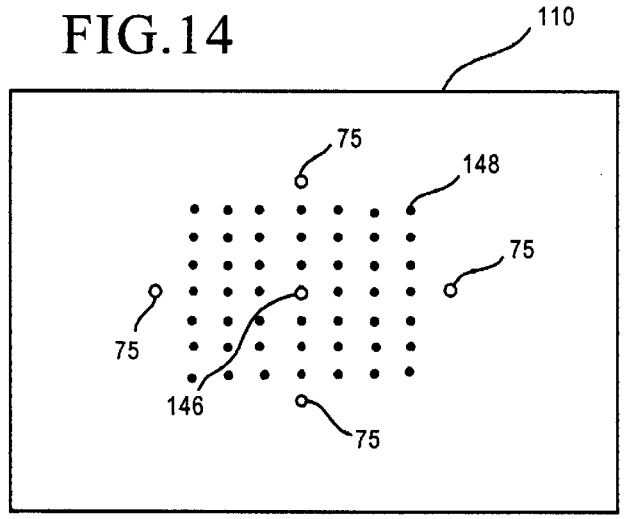
FIG. 14 is a diagram of center data points for windows in the vicinity of the local template match to be tested for a better match (also shown are center points for nearby windows tested during the fast search)

Referring to FIG. 14, the window corresponding to the local match has a center data point 146. The template is moved at a step interval of one data point in either direction along either axis up to but not including the data point which in one step size away. As the template is moved over this area, the windows tested during the local full search will have a center data point 148. FIG. 14 shows all the center points 148 for a given local full search as black dots for an implementation in which the first axis step size is four and the second axis step size is four. FIG. 14 shows the nearby center points from the fast search as open dots 75.

A correlation is performed between the template 108 and each window in the vicinity of the local match. For the vicinity shown in FIG. 14 in which the step is four, there are 48 additional windows tested. Any of the additional 48 windows or the local match which has a correlation coefficient which equals or exceeds the threshold value is a match of the template. Alternatively, of the windows where the correlation coefficient exceeds the threshold value, only the window or windows having the highest correlation coefficient(s) are selected as matched. For example, one or more windows may have the same correlation coefficient which is highest. As another example the windows corresponding to the top 'n' correlation coefficients may be selected, where each window correlation coefficient also exceeds the threshold value.

Once the template match is found, the corresponding window in the search area is the object being tracked. The relative position of the object within the search area 110 for the current image frame is compared to the relative position of the object in the search area for the prior image frame. The motion vector is derived/updated from the relative positions to define the movement of the object. In one embodiment, the vector is a linear vector derived from respective midpoints of the object from the two image frames. In another embodiment a more complex vector analysis is performed to identify rotation or other two-dimensional or three-dimensional motion of the object being tracked.

In one embodiment the area of the image frame corresponding to the template match is output to the edge energy modelling subsystem 16, where the edge potential energy of the object boundary is derived. In addition, a set of data points along the periphery of the template match is sampled to serve as an estimate of the current image object boundary. Such estimate is input to the active contour modelling subsystem 18.

Implementing the Correlation Function:

The correlation coefficient for a correlation between two data sets 'a' and 'b' is defined below. The data set 'a' is the template 108. The data set 'b' is a window of the padded template (or of a rotational offset of the padded template) for the process of finding the CAPS step sizes. The data set 'b' is a window of the search area 110 (or of a rotational offset of the search area) for the process of identifying candidate locations, potential template matches or template matches. Each of data sets 'a' and 'b' may be a matrix, image or another set of data points. The correlation coefficient, corr is:

$$corr = \frac{E\{[a - E(a)] * [b - E(b)]\}}{sd(a) * sd(b)}$$

which may be simplified to $$corr = \frac{E(a*b) - E(a)*E(b)}{sd(a)*sd(b)}$$

where
E(x)=expected value of data set (x)
sd(x)=standard deviation of data set (x)
and corr is between −1.0 and +1.0.

Motion Estimation

Referring again to FIG. 7, motion vectors for an initial frame are estimated at step 29, while motion vectors for subsequent frames are estimated at step 49.

The motion vectors Vx, Vy correspond to the flow velocities u, v described above with regard to a current frame k of the optical flow methods. The flow velocities, and thus the motion vectors are estimated using one of the methods described above (with regard to FIGS. 4 and 5). According to such methods the data from three frames (e.g., the previous frame (k−1), the current frame (k) and the next frame (k+1)) is used to derive the flow velocities. However, for an initial frame the motion estimation at step 29 relies on just the data from frames k and k+1. For a subsequent frame the motion estimation at step 49 relies on the data from frames k−1, k and k+1. For a last frame there also is an exception. For a last frame k, where there is no frame k+1, the data from frames k−1 and k are used. The result of step 29 or step 49 is a velocity estimate for each data point of the image frame k which is processed. In some embodiments a motion estimate is derived for all pixels of the frame. For other embodiments a motion estimate is derived for a subset of pixels.

Edge Energy

Referring to FIG. 7, edge energy is generated at steps 31 and 53. More particularly, it is edge potential energy which is derived. Various measures of potential energy may be implemented. In one embodiment a multiple level wavelet detection algorithm is used to extract high frequency components of an image. The high frequency details are analyzed to identify image object edges. In a preferred embodiment Haar wavelet detection is used.

The input to be processed to derive edge potential energy is an image. In one embodiment the image is the entire image frame. In other embodiments, the image is an image object (e.g., the template match area found by the CAPS subsystem 14). The derived edge potential energy is an array of potential energy for each data point (pixel) of the image.

Figure 15:
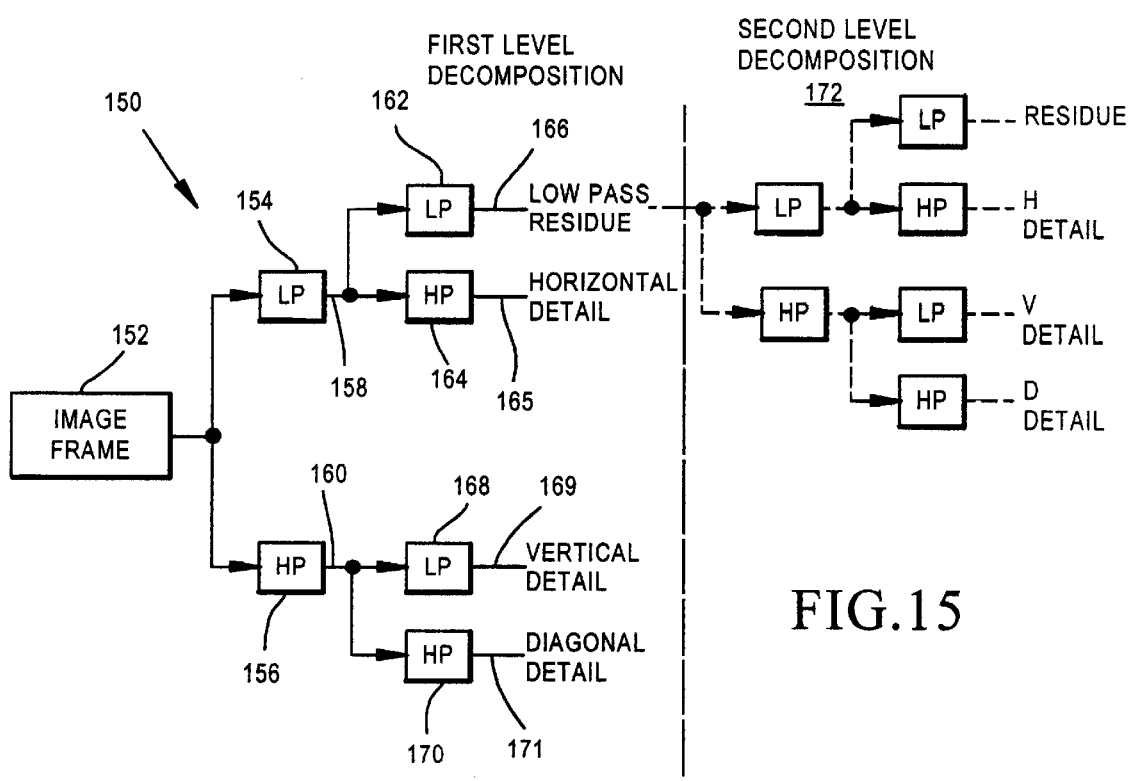
FIG. 15 is a diagram of a quadrature modelling filter for decomposing an image to achieve detailing images and a low pass residue.

The input image is decomposed by filtering the image with a quadrature mirror filter (QMF) pair which brings out the image details, while simultaneously smoothing the image. The QMF pair includes a high pass filter for bringing out the image details, and a low pass filter for smoothing the image. Referring to FIG. 15 a multiple level QMF decomposition 150 of an image frame 152 is shown. The image frame 152 is passed through a low pass filter 154 and a high pass filter 156 to obtain a low pass component 158 and a high pass component 160. These components, in turn, are filtered. The low pass component 158 is passed through a low pass filter 162 and a high pass filter 164. The output of low pass filter 162 is lowpass residue 166. The output of high pass filter 164 is the horizontal detail 165 of the image frame 152.

In parallel, the high pass component 160 is passed through a low pass filter 168 and a high pass filter 170. The output of the low pass filter 168 is the vertical detail 169 of the image frame 152. The output of the high pass filter 170 is the diagonal detail 171 of the image frame 152. The low pass residue 166 and the three detailing images 165, 169, 171 are the first level QMF decomposition of the image frame 152. In some embodiments a second level QMF decomposition 172 also is performed in which the low pass residue 166 is input similarly through two stages of low pass and high pass filters to achieve a second-level, low-pass residue and three detailing images (horizontal detail, vertical detail and diagonal detail). In some embodiments the same filters may be used in the second level decomposition as were used in the first level decomposition. for example, the low pass residue 166 is merely input to filters 154, 156 instead of the image frame 152.

The high pass filtering function is a wavelet transformation ($\psi$), while the low pass filtering function is a scaling function ($\phi$) corresponding with the wavelet. The scaling function causes smoothing, while the three wavelets bring out the image details. The scaling function and wavelet transforms in one dimensional space are given by the equations below:

$$\phi_{a,b}(x) = \frac{1}{\sqrt{a}} \phi\left(\frac{x-b}{a}\right), a > b, b \in R$$

$$\psi_{a,b}(x) = \frac{1}{\sqrt{a}} \psi\left(\frac{x-b}{a}\right), a > 0, b \in R$$

where, $\phi_{a,b}(x)$ is the family of scaling function at sale a and translated by b;

$\psi_{a,b}(x)$ is the family of wavelets at scale a and translated by b;

a is the scaling factor;

b is the translation desired $\phi$ is $\phi_{0,0}$; and $\psi$ vis $\psi_{0,0}$.

Two dimensional wavelets are defined as tensor products of the one-dimensional wavelets. The two-dimensional scaling function is $\phi(x,y)=\phi(x)*\phi(y)$. The two-dimensional wavelets are:

$$\psi_1(x,y)=\phi(x)*\psi(y)$$

$$\psi_2(x,y)=\phi(y)*\psi(x)$$

$$\psi_3(x,y)=\psi(x)*\psi(y)$$

Although the scaling may be varied from one level of decomposition to another, in one embodiment such scaling is not varied.

A first level QMF decomposition is performed. For a second level decomposition the low pass residue 166 of the first level decomposition is analyzed without further downsampling. In some embodiments additional levels of decomposition may be obtained by passing the low pass residue of the prior level through a two stage filtering process (similar to that for the prior levels).

For any given level of decomposition there are four images: the low pass residue, the vertical detail, the horizontal detail and the diagonal detail. The horizontal and vertical detail are gradients of the image along x and y axes. The magnitude of the image is taken at every level of decomposition. The diagonal details have been omitted in one embodiment, because they did not contribute significantly.

In a preferred embodiment up to five levels of decomposition are used for each color component of the image frame, in which the low pass residue from the prior stage is input to the filters 154, 156 to generate image details and residue for the current stage. Preferably, only data from the even levels (e.g., levels 2, 4, and 6) are used to avoid half-pixel shifts in the edge energy. The integration of the multiple levels and multiple channel (color component) data is guided by their principle component. In one implementation the ratio of multiple-level edge gradients is selected as 1:2:4:8:16 for the five levels of decomposition. With respect to the color components (Y, Cr, Cb) and motion estimates (Vx, Vy), edge gradient ratios of 1:1:1:1:1 are used.

In a preferred embodiment the horizontal detail and vertical detail of a given level (i) of decomposition are combined to generate the edge potential energy (EPE) for that level as follows:

$EPE$ $(i)$=sqrt [horizontal detail$^2(i)$+vertical detail$^2(i)$]

where i=i-th level of decomposition.

For an embodiment in which 5 levels of decomposition are executed, the total edge potential energy (EPE) for a given component are summed together:

$EPE_c=EPE_c(2)+2*EPE_c(4)+4*EPE_c(6)+8*EPE_c(8)+16*EPE_c(10)$ where c is the component being processed. In one embodiment there are five components being processed. There is an edge potential energy calculation for each color component (e.g., Y, Cr, and Cb) and for each motion estimate (e.g., Vx and Vy). Thus, for each pixel of an image frame there are three color values and two motion values. The color values for color Y of each pixel are processed together to derive an $EPE_y$ value. The color values for color Cr of each pixel are processed together to derive an $EPE_{Cr}$ value. The color values for color Cb of each pixel are processed together to derive an $EPE_{Cb}$ value. The motion values values for motion estimate Vx of each pixel are processed together to derive an $EPE_{Vx}$ value. The motion values for motion estimate Vy of each pixel are processed together to derive an $EPE_{Vy}$ value.

The overall edge potential energy for the entire frame, inclusive of all color and motion components is the weighted sum of the energy from the different components. For a weighting factor of (1, 1, 1, 1, 1) the total potential energy is given by:

Total Edge Potential Energy=$EPE_y+EPE_{cr}+EPE_{Cb}+EPE_{Vx}+EPE_{Vy}$ where Y, Cr and Cb are the color components and Vx and Vy are the motion estimates. In other embodiments R,G and B color components or those of another color component model may be used. The weighting factor may vary depending on the color components model being used. Similarly additional or alternative motion components also may be used, such as for a third axis or for polar coordinates.

The total edge potential energy is an array having an energy value for each pixel of the image processed. The edge potential energy is input to the active contour model for use in object segmentation. In some embodiments the edge energy is input to the CAPS process. When providing an input to the CAPS process, the edge energy is being used to predict where the object being tracked is located in a current image frame. For such an embodiment, the "motion estimation" step 49 and the "Generate Edge Energy" step 53 are executed prior to the CAPS step 45 (see FIG. 7).

Note that in various embodiments, the edge potential energy is derived before or after the CAPS model executes. When the edge potential energy is calculated first, a predicted location for the image object may be derived with the edge potential energy as an input to the CAPS subsystem 14. When the CAPS model executes first, the image being processed for edge potential energy is the template matched portion of the image frame.

Active Contour Model—Object Segmentation

Once an image object has been identified, the image boundary (i.e., edge) is segmented to more accurately model the object edges. The active contour modelling subsystem 18 performs such segmentation. In particular, at step 55 (FIG. 7) an active contour model is applied to segment the image object boundary.

Input to the active contour model is the derived total edge potential energy and a current image object boundary. The total edge potential energy is derived at step 53 (see FIG. 7). For an initial frame the current image object boundary is the boundary input to the system at step 23 (see FIG. 7). The set of data points for the current image object boundary are used by the active contour model at step 33 (see FIG. 7).

For subsequent image frames, the current image object boundary is derived by the CAPS subsystem 14, as described above. The set of data points for the current image object boundary are used by the active contour model at step 55 (see FIG. 7).

Figure 16:
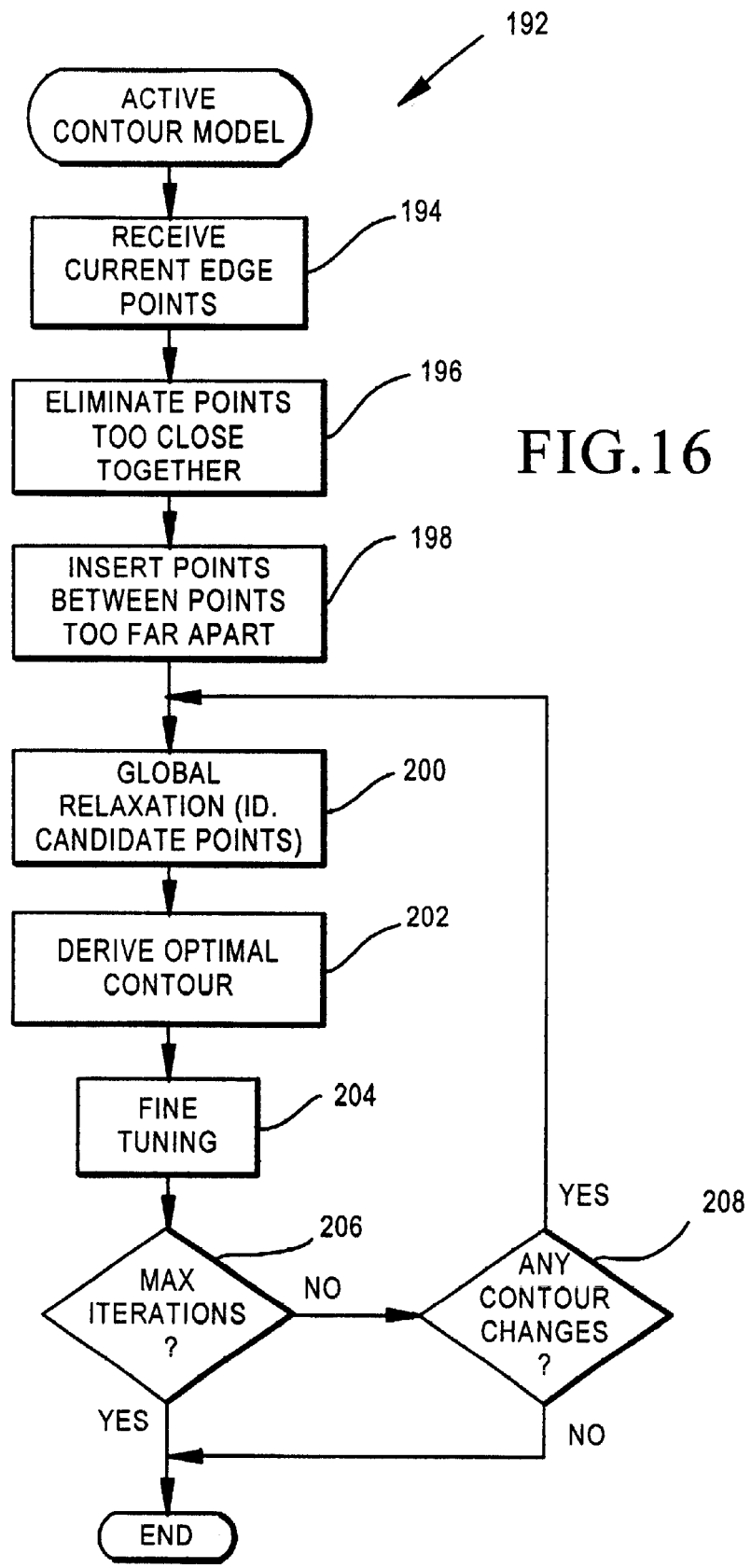
FIG. 16 is a flow chart of the active contour modelling process according to an embodiment of this invention.

Referring to FIG. 16, a flow chart 192 of the active contour model includes a first step 194 at which edge points are received by the active contour modelling subsystem 18. The number of input edge points may vary. At step 196, the edge points which are too close together are eliminated, (i.e., less than a first threshold distance apart). In one embodiment points are considered too close together when they are less than 2.5 pixels apart. In other embodiments the distance may be smaller or larger. At step 198 additional points are added by interpolation where the adjacent points are too far apart, (i.e., greater than a second threshold distance apart). In one embodiment points are considered too far apart together when they are greater than 6.0 pixels apart. In other embodiments the distance may be smaller or larger than 6.0 while being larger than the first threshold distance.

At this stage of the process there are a given number of current edge points, as modified from the input edge points. Although the number of edge points may vary from contour to contour, we will describe the process for N current edge points. At step 200 the active contour modelling subsystem 18 performs global relaxation on the N current edge points. To do so, for each current edge point, M candidate points are selected from a box around the current edge point. In one embodiment M equals 4, although in various embodiments the number of candidate points may vary. In one embodiment a 5×5 box is used. However, the size of the box may vary. A larger box leads to a more flexible contour, but more computation time. The shape of the box may be square, rectangular or another shape.

Figure 17:
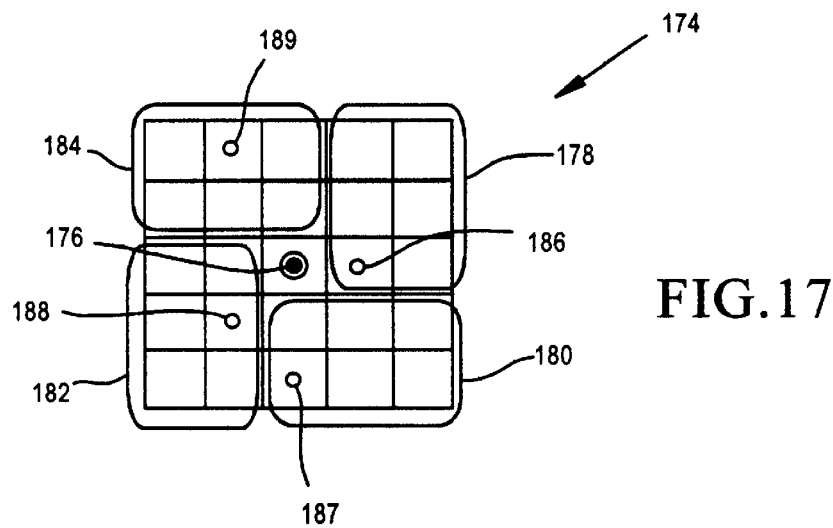
FIG. 17 is a diagram of a 5×5 pixel domain about a current edge point (pixel) used for selecting other candidate points which might be used in place of the current edge point.

Referring to FIG. 17, a 5×5 box 174 of pixels surrounding the current edge point 176 is divided into four regions 178, 180, 182, 184. Within each region there are 6 pixels. One of those 6 pixels is selected in each region to be a candidate pixel ('point') which may potentially replace the current edge point 176 as an object boundary edge point. Thus, 4 candidate points 186–189 are selected for each current edge point 176. In alternative embodiments a different number of candidate points, or another method of selecting candidate points, may be used.

Figure 18:
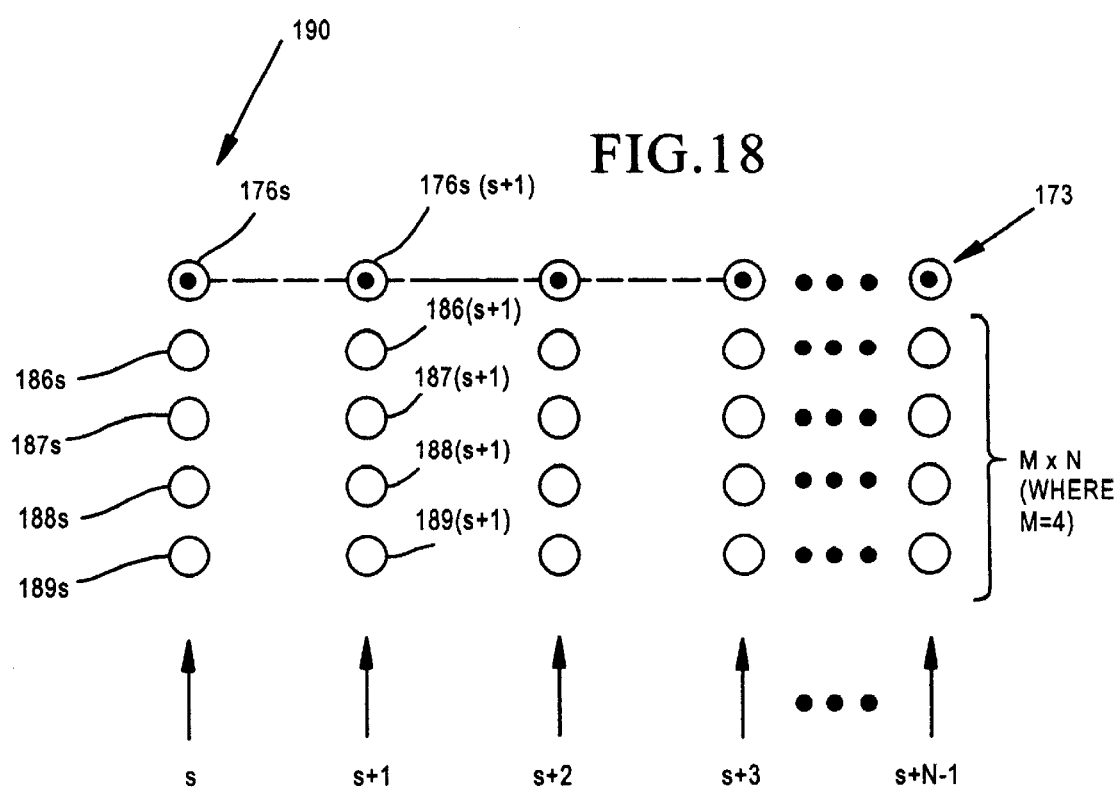
FIG. 18 is a diagram of potential edge points processed to preserve one optimal path for an image object boundary according to an embodiment of this invention.

For a given region 78, the candidate point is the pixel among the 6 potential points which has the highest edge potential energy. For an image object boundary which has N current edge points, and where there are M (e.g., four) alternative candidate points for each one of the N points, there are $(M+1)^N$ (e.g., $5^N$) possible contours from which to select the modelled image object boundary. At step 202 a travel algorithm is applied to the current edge points with the alternative candidate points to select an optimal contour path. FIG. 18 shows a travel path diagram for the possible contours. There are (M+1 (e.g., 5) points in each column. The five points correspond to a current edge point 176 and four candidate edge points 186, 189 for such current edge point 176. The number of points in each row (which also equals the number of columns) corresponds to N.

To choose the optimal image object boundary, a starting location 190 on the current contour is selected. Such location 190 corresponds to any given current edge point 176 and its M=4 candidate edge points 186–189. From each of such M+1=5 points, an optimal path is derived. Of the 5 resulting paths the most optimal path then is selected to be the modelled object boundary. The process for deriving the optimal path is the same for each of the M+1 paths to be derived.

Figure 19:
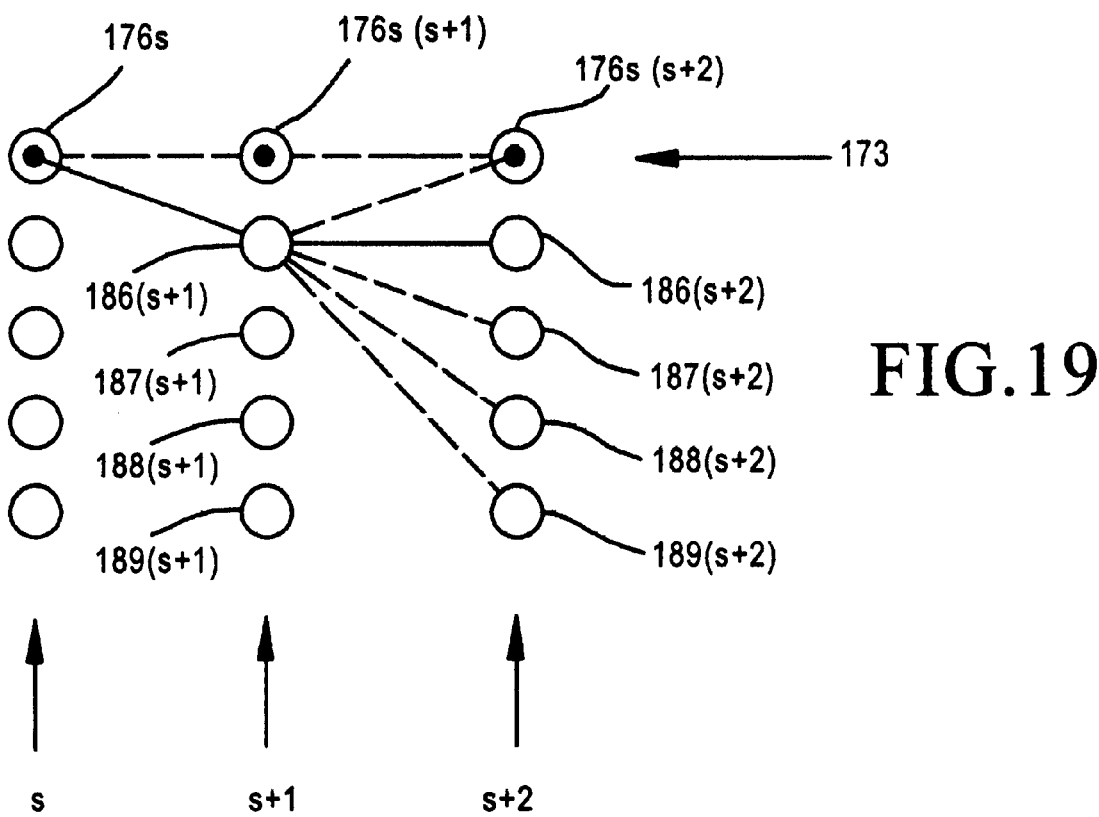
FIG. 19 is a partial travel path of the contour in the process of being derived from the set of points of FIG. 18.

Referring to FIG. 19, consider a path that is to start from edge point 176s. A segment of the path is constructed by advancing to one of the M+1 points in the adjacent column s+1. Thus, one choice is to step to point 176(s+1). Another choice is to step to candidate point 186(s+1). The others choices include 187(s+1), 188(s+1) and 189(s+1) Only one choice is selected. The choice is made by determining for which of the M+1=5 points in column (s+1) the resulting path has the least difference in energy (e.g., the most energy savings). The selected point is preserved along with a distance of how far such point is from the current point in column s+1. Consider an example where point 186(s+1) is selected. Such point is preserved along with a distance value (e.g., in pixels) of far many pixels such point is from the point 176(s+1).

Similarly, to construct the next segment of the path a point among the M+1 points in column s+2 is selected. For each segment along the path only one of the M+1=5 potential segments are preserved, along with a distance from such point to the current point 176 in the same column.

The same process is performed to derive a path which starts from point 186s. A first segment of the path is constructed by advancing to one of the M+1 points in the adjacent column s+1. One choice is to step to point 176(s+ 1). Another choice is to step to candidate point 186(s+1). The others choices include 187(s+1), 188(s+1) and 189(s+ 1). Only one choice is selected. The choice is made by determining for which of the M+1=5 points in column (s+1) the resulting path has the most difference in energy relative to the current contour 173. The selected point is preserved along with a distance of how far such point is from the current point in column s+1. Respective paths starting from point 187s, 188s and 189s, respectively are constructed in the same manner. The M+1 resulting paths then are compared to see which one is the most optimal path, (e.g., most difference in energy relative tot he current contour 173).

According to this method, rather than perform $5^N$ computations—one for each one of the potential contours—only (M+1)*(M+1)*N—(e.g., 5*(5*N))—computations occur.

The energy difference between a contour which steps to the current point for a given point among the 5 potential points at a given step is derived as follows:

$$\Delta E_i = \sum_{i=1}^{N} \delta E_i$$

$$\delta E_i = f_i^1 - f_i^0 - f_i^0 * \frac{d_i^1 + d_i^2 + d_i^3 - d_i^0}{d_i^0}$$

$$= f_i^1 - f_i^0 * \frac{d_i^1 + d_i^2 + d_i^3}{d_i^0}$$

where, $$f(u1, u2, v1, v2) = \int_{(u1,u2)}^{(v1,v2)} TEPE * ds$$

$f_i^0 = f(x_i, y_i, x_{i+1}, y_{i+1})$ $f_i^1 = f(a_i, b_i, a_{i+1}, b_{i+1})$ $d_i^0 = |(x_i, y_i) - (x_{i+1}, y_{i+1})|$ $d_i^1 = |(a_i, b_i) - (a_{i+1}, b_{i+1})|$ $d_i^2 = |[(a_i, b_i) - (a_{i+1}, b_{i+1})] - [(x_i, y_i) - (x_{i+1}, y_{i+1})]|$ $d_i^3 = |(a_i, b_i) - (x_i, y_i)|$

TEPE=total edge potential energy ds=derivative with respect to s (s=length of contour segment between two points)

$f_i^0$ represents the integral of the total edge potential energy along the i-th segment of the current contour;

$f_i^1$ represents the integral of the total edge potential energy along the i-th segment of the candidate contour;

$d_i^0$ represents the length of the i-th segment of the current contour;

$d_i^1$ represents the length of the i-th segment of the candidate contour;

$d_i^2$ represents the distance between the two segments when we look at them as vectors;

$d_i^3$ represents the distance between the i-th current contour point and the i-th candidate contour point.

The terms $d_i^0$ and $d_i^1$ correspond to tension in the contour. The term $d_i^2$ corresponds to stiffness for keeping the shape of the modelled contour similar to the current contour. The term $d_i^3$ corresponds to pressure to keep the candidate contour close to the current contour. The optimal contour is the one having the optimal $\Delta E$. In one embodiment this is the maximum $\Delta E$. In other embodiments negative TEPE is used instead, so optimum becomes the minimum $\Delta E$.

At the completion of step 202, the optimal contour is a polygon. As a result, the points identified at step 202 selected from the travel algorithm, may or may not be on the actual smooth object boundary. Thus, fine tuning is performed at step 204.

Each segment of the optimal contour includes the points selected using the travel algorithm as end points, along with the pixels in between. The pixels in between although not part of the travel problem are part of the input image being processed. In the fine tuning process the pixel along the segment having the highest edge potential energy is selected as the most reliable point of such group for being on the actual object boundary. A most reliable point is selected for each segment of the polygon (i.e., optimal contour path output from the travel algorithm). Points then are selected to be filled in between the most reliable points using the criteria: (i) a new point should be 8 connected to a previously selected boundary point, and (ii) the distance of the new boundary point to the next boundary point should be less than the distance from the previous boundary point to the next boundary point.

Once the object boundary has been fine tuned, the active contour process is repeated with the object boundary of the prior iteration being the current edge points. Global relaxation then is performed again at step 200 to select alternative candidate points for the current edge points. Then the travel algorithm is reapplied at step 202, followed by fine tuning at step 204. After the fine tuning step, at step 206 an iteration count is tested to determine if a maximum number of iterations have been executed. If a maximum number of iterations has occurred, then the edge points making up the fine tuned boundary are the image object boundary points output at step 57 (see FIG. 7). If not, then at step 208 the contour is checked to see if it has changed from the prior iteration. If it has not changed then the edge points making up the fine tuned boundary are the image object boundary points. If the contour has changed, then the process is repeated commencing at step 200 with the global relaxation process.

Meritorious and Advantageous Effects

By adaptively defining the image gradients (spatial and temporal or just temporal), artifacts resulting from occlusions can be avoided for cases where the optical flow is varying smoothly, (i.e., generally constant from frames k−1 through k, although some variation may occur).

Although a preferred embodiment of the invention has been illustrated and described, various alternatives, modifications and equivalents may be used. For example, although specific edge detection and averaging kernels are presented (equations VI, XI and XII), more sophisticated edge detectors and averaging kernels may be used, instead, to initialize the spatial and/or temporal gradients. Also, to further generalize the optical flow determination, the parameter S may be refashioned as a parameter, $s_m$, by convolving S with a smoothing kernel, as for example by equation (XVII):

$S_m^{f,b}(i,j,k) = (1/16) \cdot [4 \cdot S^{f,b}(i,j,k)$ $+ 2 \cdot S^{f,b}(i-1,j,k) + 2 \cdot S^{f,b}(i+1,j,k)$ $+ 2 \cdot S^{f,b}(i,j+1,k) + 2 \cdot S^{f,b}(i,j-1,k)$ $+ S^{f,b}(i+1,j+1,k)$ $+ S^{f,b}(i-1,j-1,k) + S^{f,b}(i+1,j-1,k)$ $+ S^{f,b}(i-1,j+1,k)]$ (XVII)

The inventions described herein are applicable to various optical flow determinations, including but not limited to hierarchical optical flow techniques, temporal refinement optical flow techniques, and color optical flow techniques. Such determinations are useful for many computer vision compression techniques, such as motion detection, object tracking, video conferencing, MPEG-4 encoding, and more. Such determinations also may be applied to data compression methods. Therefore, the foregoing description should not be taken as limiting the scope of the inventions which are defined by the appended claims.

What is claimed is:

1. A method of predetermining the optical flow of a plurality of image pixels in an image frame, k, among a sequence of image frames, k−1, k and k+1, the method comprising the steps of:

initializing for the plurality of image pixels adaptive horizontal spatial gradients, adaptive vertical spatial gradients, adaptive temporal gradients, horizontal image velocity and vertical image velocity, wherein said adaptive horizontal spatial gradients, adaptive vertical spatial gradients and adaptive temporal gradients are derived from said image frames k−1, k and k+1;

iteratively determining for a given pixel of said plurality of image pixels for frame k, a series of acts, including:

estimating a horizontal spatial gradient at the given pixel from the adaptive horizontal spatial gradient at said given pixel;

estimating a vertical spatial gradient at the given pixel from the adaptive vertical spatial gradient at said given pixel;

estimating a temporal gradient at the given pixel from the adaptive temporal gradient at said given pixel;

estimating horizontal image velcity and a vertical image velocity at the given pixel based on a weighted local average of horizontal image velocity, a weighted local average of vertical image velocity, the estimated horizontal and vertical spatial gradients and the estimated temporal gradient;

determining whether to execute another iteration for said given image pixel;

when executing another iteration, estimating the weighted local average of the horizontal image velocity and the weighted local average of the vertical image velocity; and when not executing another iteration accepting the estimated horizontal image velocity and the estimated vertical image velocity of the given pixel as the optical flow for the given pixel.

2. The method of claim 1, further comprising the steps of:

iteratively determining for each other pixel of said plurality of image pixels for frame k, a series of acts for estimating the horizontal spatial gradient, the vertical spatial gradient, the temporal gradient, the horizontal image velocity and the vertical image velocity, respectively, of said each other pixel.

3. A method for determining the optical flow of a plurality of image pixels in an image frame, k, among a sequence of image frames, k−1, k and k+1, the method comprising the steps of:

initializing for the plurality of image pixels a horizontal spatial gradient, a vertical spatial gradient, adaptive temporal gradients, horizontal image velocity and vertical image velocity, wherein the adaptive temporal gradients are derived from image frames k−1, k and k+1;

iteratively determining for a given pixel of said plurality of image pixels for frame k, a series of acts, including:

estimating a temporal gradient at the given pixel from the adaptive temporal gradients at said given pixel;

estimating a horizontal image velocity and a vertical image velocity at the given pixel based on a weighted local average of horizontal image velocity, a weighted local average of vertical image velocity, the horizontal and vertical spatial gradients and the estimated temporal gradient;

determining whether to execute another iteration for said image pixel;

when executing another iteration, estimating the weighted local average of the horizontal image velocity and the weighted local average of the vertical image velocity; and when not executing another iteration accepting the estimated horizontal image velocity and the estimated vertical image velocity of the given pixel as the optical flow for the given pixel.

4. The method of claim 3, further comprising the steps of:

iteratively determining for each other pixel of said plurality of image pixels for frame k, a series of acts for estimating the temporal gradient, the horizontal image velocity and the vertical image velocity, respectively, of said each other pixel.

5. A method for tracking an image object within a sequence of image frames, the method comprising:

determined for a current image frame whether there has been a change of scene;

where there has not been a change in scene, searching the current image frame for presence of the image object;

where presence of the image object has been found, identifying a first set of data points corresponding to the image object and a second set of N data points corresponding to an initial estimate of the desired contour of the image object, wherein said second set of data points define a current object contour, the first set of data points including at least the second set of data points;

determining the optical flow for the first set of data points based on the current image frame, a previous image frame and a subsequent image frame;

deriving edge potential energy for the first set of data points based at least in part on the determined optical flow;

refining the current object contour into the desired contour using the current object contour, and the derived edge potential energy.

6. The method of claim 5, in which the step of determining the optical flow for the first set of data points, comprises:

initializing for the first set of data points adaptive horizontal spatial gradients, adaptive vertical spatial gradients, adaptive temporal gradients, horizontal velocity and vertical image velocity, wherein said adaptive horizontal spatial gradients, adaptive vertical spatial gradients and adaptive temporal gradients are derived from said current image frame, said previous image frame and said subsequent image frame;

iteratively determining for a given data point among said first set of data points, a series of acts, including:

estimating a horizontal spatial gradient at the given data point from the adaptive horizontal spatial gradient at said given data point;

estimating a vertical spatial gradient at the given data point from the adaptive vertical spatial gradient at said given data point;

estimating a temporal gradient at the given data point from the adaptive temporal gradients at said given data point;

estimating a horizontal image velocity and a vertical image velocity at the given data point based on a weighted local average of horizontal image velocity, a weighted local average of vertical image velocity, the horizontal and vertical spatial gradients and the estimated temporal gradient;

determining whether to execute another iteration for said given data point;

when executing another iteration, estimating the weighted local average of the horizontal image velocity and the weighted local average of the vertical image velocity; and when not executing another iteration accepting the estimated horizontal image velocity and the estimated vertical image velocity of the given data point as the optical flow for the given data point.

7. The method of claim 6, further comprising the steps of:
iteratively determining for each other data point among the first set of data points, a series of acts for estimating the horizontal spatial gradient, the vertical spatial gradient, the temporal gradient, the horizontal image velocity and the vertical image velocity, respectively, of said each other data point.

8. The method of claim 6, further comprising the steps of:
for each one data point among said second set of data points, selecting a corresponding plurality of M candidate data points from the first set of data points, the second set of data points and the corresponding plurality of candidate data points forming an array of (M+1) by N data points;
selecting a starting set of M+1 data points, which includes a data point among the second set of data points and its corresponding plurality of M candidate data points;
for each data point among the starting set of M+1 data points, selecting an optimal object contour path to derive M+1 optimal object contour paths, in which each one optimal contour path is selected segment by segment, wherein a next segment is added to said each one optimal object contour path by selecting one data point among an adjacent set of M+1 data points, the adjacent set of M+1 data points including a data point from the second set of data points and its corresponding plurality of candidate data points, the selected one data point for said next segment being selected by calculating an energy difference relative to the current object contour for each one data point among said adjacent set of M+1 data points; and
selecting one of the M+1 optimal object contour paths.

9. The method of claim 8, in which the step of selecting a corresponding plurality of M candidate data points from the first set of data points, comprises, for each one data point among said second set of data points:
grouping into M groups, the data points in the vicinity of said one data point of the second set of data points; and
selecting as a candidate data point, the data point from each one of the M groups which has the optimal edge potential energy.

10. The method of claim 5, in which the step of determining the optical flow for the first set of data points, comprises:
initializing for the first set of data points a horizontal spatial gradient, a vertical spatial gradient, adaptive temporal gradients, horizontal image velocity and vertical image velocity wherein the adaptive temporal gradients are derived from image frames current image frame, said previous image frame and said subsequent image frame;
iteratively determining for a given data point among said first set of data points, a series of acts, including:
estimating a temporal gradient at the given data point from the adaptive temporal gradients at said given data point;
estimating a horizontal image velcity and a vertical image at the given data point based on a weighted local average of horizontal image velocity, a weighted local average of vertical image velocity, the horizontal and vertical spatial gradients and the estimated temporal gradient;
determining whether to execute another iteration for said given point;
when executing another iteration, estimating the weighted local average of the horizontal image velocity and the weighted local average of the vertical image velocity; and
when not executing another iteration accepting the estimated horizontal image velocity and the estimated vertical image velocity of the given data point as the optical flow for the given point.

11. The method of claim 10, further comprising the steps of:
iteratively determining for each other data point among the first set of data points, a series of acts for estimating the temporal gradient, the horizontal image velocity and the vertical image velocity, respectively, of said each other data point.

12. The method of claim 10, further comprising the steps of:
for each one data point among said second set of data points, selecting a corresponding plurality of M candidate data points from the first set of data points, the second set of data points and the corresponding plurality of candidate data points forming an array of (M+1) by N data points;
selecting a starting set of M+1 data points, which includes a data point among the second set of data points and its corresponding plurality of M candidate data points;
for each data point among the starting set of M+1 data points, selecting an optimal object contour path to derive M+1 optimal object contour paths, in which each one optimal contour path is selected segment by segment, wherein a next segment is added to said each one optimal object contour path by selecting one data point among an adjacent set of M+1 data points, the adjacent set of M+1 data points including a data point from the second set of data points and its corresponding plurality of candidate data points, the selected one data point for said next segment being selected by calculating an energy difference relative to the current object contour for each one data point among said adjacent set of M+1 data points; and
selecting one of the M+1 optimal object contour paths.

13. The method of claim 12, in which the step of selecting a corresponding plurality of M candidate data points from the first set of data points, comprises, for each one data point among said second set of data points:
grouping into M groups, the data points in the vicinity of said one data point of the second set of data points; and
selecting as a candidate data point, the data point from each one of the M groups which has the optimal edge potential energy.

14. A system for determining the optical flow of a plurality of image pixels in an image frame, k, among a sequence of image frames, k−1, k and k+1, the system comprising:
a processor which initializes, for the plurality of image pixels, adaptive horizontal spatial gradients, adaptive vertical spatial gradients, adaptive temporal gradients, horizontal image velocity and vertical image velocity, wherein said adaptive horizontal spatial gradients, adaptive vertical spatial gradients and adaptive temporal gradients are derived from said image frames k−1, k and k+1;
a processor which iteratively determines for a given pixel of said plurality of image pixels for frame k, a series of estimates, including:

an estimate of a horizontal spatial gradient at the given pixel from the adaptive horizontal spatial gradient at said given pixel;

an estimate of a vertical spatial gradient at the given pixel from the adaptive vertical spatial gradient at said given pixel;

an estimate of a temporal gradient at the given pixel from the adaptive temporal gradient at said given pixel;

an estimate of a horizontal image velocity and a vertical image velocity at the given pixel based on a weighted local average of horizontal image velocity, a weighted local average of vertical image velocity, the estimated horizontal and vertical spatial gradients and the estimated temporal gradient;

wherein the iteratively determining processor determines whether to execute another iteration for said given image pixel, when executing another iteration, the iteratively determining processor estimating the weighted local average of the horizontal image velocity and the weighted local average of the vertical image velocity, and when not executing another iteration the iteratively determining processor accepting the estimated horizontal image velocity and the estimated vertical image velocity of the given pixel as the optical flow for the given pixel.

15. The system of claim 14 for tracking an image object within a sequence of image frames, the system further comprising:

means for determining for a current image frame whether there has been a change of scene;

where there has not been a change in scene, means for searching the current image frame for presence of the image object;

where presence of the image object has been found, means for identifying a first set of data points corresponding to the image object and a second set of data points corresponding to an initial estimate of the desired contour of the image object, wherein said second set of data points define a current object contour, the first set of data points including at least the second set of data points;

means for deriving edge potential energy for the first set of data points based at least in part on the determined optical flow; and means for refining the current object contour into the desired contour using the current object contour, and the derived edge potential energy.

16. A system for determining the optical flow of a plurality of image pixels in an image frame, k, among a sequence of image frames, k−1, k and k+1, the system comprising:

a processor which initializes, for the plurality of image pixels, a horizontal spatial gradient, a vertical spatial gradient, adaptive temporal gradients, horizontal image velocity and vertical image velocity, wherein the adaptive temporal gradients are derived from image frames k−1, k and k+1;

a processor which iteratively determines for a given pixel of said plurality of image pixels for frame k, a series of estimates, including:

an estimate of a temporal gradient at the given pixel from the adaptive temporal gradient at said given pixel;

an estimate of a horizontal image velocity and a vertical image velocity at the given pixel based on a weighted local average of horizontal image velocity, a weighted local average of vertical image velocity, the horizontal and vertical spatial gradients and the estimated temporal gradient;

wherein the iteratively determining processor determines whether to execute another iteration for said given image pixel, when executing another iteration, the iteratively determining processor estimating the weighted local average of the horizontal image velocity and the weighted local average of the vertical image velocity, and when not executing another iteration the iteratively determining processor accepting the estimated horizontal image velocity and the estimated vertical image velocity of the given pixel as the optical flow for the given pixel.

17. The system of claim 16 for tracking an image object within a sequence of image frames, the system further comprising:

means for determining for a current image frame whether there has been a change of scene;

where there has not been a change in scene, means for searching the current image frame for presence of the image object;

where presence of the image object has been found, means for identifying a first set of data points corresponding to the image object and a second set of data points corresponding to an initial estimate of the desired contour of the image object, wherein said second set of data points define a current object contour, the first set of data points including at least the second set of data points;

means for deriving edge potential energy for the first set of data points based at least in part on the determined optical flow; and means for refining the current object contour into the desired contour using the current object contour, and the derived edge potential energy.

* * * * *